United States Patent [19]

Taguchi

[11] Patent Number: 5,719,969
[45] Date of Patent: Feb. 17, 1998

[54] DATA INPUT APPARATUS AND DATA PROCESSING APPARATUS

[75] Inventor: Tomishige Taguchi, Urawa, Japan

[73] Assignee: Canon Kabushiki Kaisha, Tokyo, Japan

[21] Appl. No.: 531,285

[22] Filed: Sep. 20, 1995

Related U.S. Application Data

[63] Continuation of Ser. No. 80,867, Jun. 24, 1993, abandoned.

[30] Foreign Application Priority Data

Jun. 30, 1992 [JP] Japan ................... 4-172187

[51] Int. Cl.$^6$ ................................................ G06K 9/03
[52] U.S. Cl. ................... 382/311; 382/176; 382/216; 382/299
[58] Field of Search .................. 382/173, 176, 382/232, 227, 309, 310, 311, 312, 299, 301, 298, 216

[56] References Cited

U.S. PATENT DOCUMENTS

| | | | |
|---|---|---|---|
| 3,651,459 | 3/1972 | Hahn | 382/57 |
| 3,778,768 | 12/1973 | Brisk et al. | 372/50 |
| 3,848,228 | 11/1974 | MacNeill | 382/57 |
| 4,375,058 | 2/1983 | Bouma et al. | 382/10 |
| 4,903,315 | 2/1990 | Peppers et al. | 382/47 |
| 4,922,349 | 5/1990 | Abe et al. | 358/433 |
| 5,053,896 | 10/1991 | Sakata et al. | 360/71 |
| 5,121,440 | 6/1992 | Ballard et al. | 382/10 |
| 5,132,842 | 7/1992 | Yeh | 382/47 |
| 5,251,273 | 10/1993 | Betts et al. | 382/57 |

FOREIGN PATENT DOCUMENTS

| | | |
|---|---|---|
| 1126636 | 5/1989 | Japan . |
| 4-14957 | 1/1992 | Japan . |

*Primary Examiner*—Leo Boudreau
*Assistant Examiner*—Chris Kelley
*Attorney, Agent, or Firm*—Fitzpatrick, Cella, Harper & Scinto

[57] ABSTRACT

A data input apparatus includes an image pickup with a zooming function, for converting an original image into an electrical signal, an area judger for judging at least a character area from the image taken by the image pickup and a character recognizer for converting the character image, in the character area judged by the area judger, into a character code. A detector detects errors in the character recognition and a controller controls the zooming function of the image pickup according to an output of the detector thereby effecting the character recognition with an enlarged image when errors increase.

28 Claims, 24 Drawing Sheets

OBTAINED CODE STRING = 544454555565

FIG. 17

| FEATURE PATTERN #1 | | |
|---|---|---|
| M1 | B | B |
| M1 | B | B |
| M1 | B | B |

| FEATURE PATTERN #2 | | |
|---|---|---|
| B | B | B |
| B | B | B |
| B | B | B |

| FEATURE PATTERN #3 | | |
|---|---|---|
| M1 | M2 | M1 |
| M1 | M2 | M1 |
| M1 | M2 | M1 |

| FEATURE PATTERN #4 | | |
|---|---|---|
| W | W | M2 |
| W | W | M2 |
| W | W | M2 |

| FEATURE PATTERN #5 | | |
|---|---|---|
| W | M2 | M1 |
| W | M2 | M1 |
| W | M2 | M1 |

| FEATURE PATTERN #6 | | |
|---|---|---|
| M2 | M1 | B |
| M2 | M1 | B |
| M2 | M1 | B |

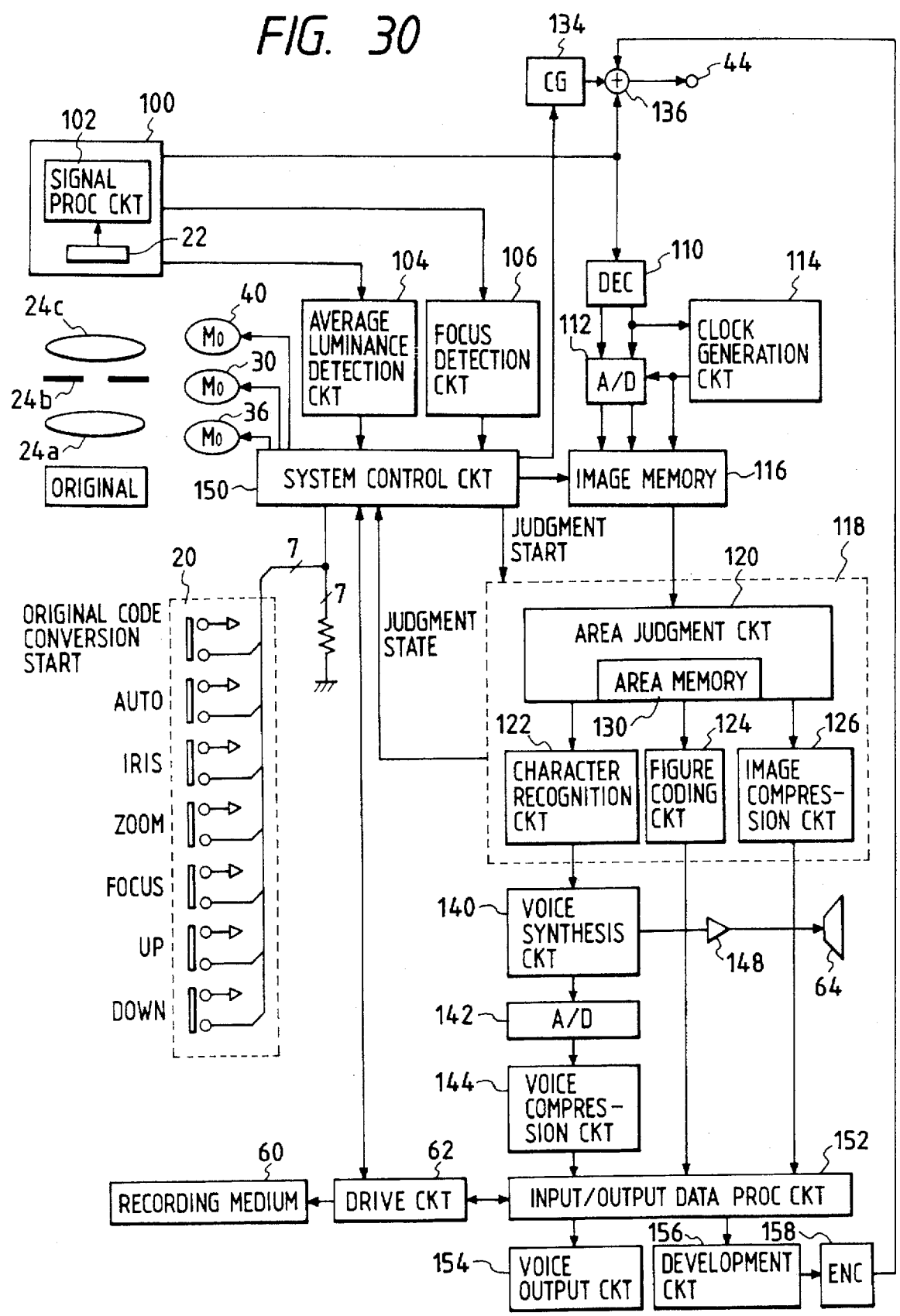

DATA INPUT APPARATUS AND DATA PROCESSING APPARATUS

This application is a continuation of application Ser. No. 08/080,867 filed Jun. 24, 1993, now abandoned.

BACKGROUND OF THE INVENTION

1. Field of the Invention

The present invention relates to a data input apparatus and a data processing apparatus, and more particularly to such an apparatus provided with a character recognizing function.

2. Related Background Art

An image input or reading apparatus is used for converting a printed image, such as a newspaper or a magazine, into electronic data. The conventional image input apparatus is designed to scan the original image with a line scanner in the main and sub scanning directions and to release pixel signals in series. The output format can be selected in analog or digital form, and also in monochromatic binary signal, monochromatic continuous tonal signal or color signal, and, with respect to the resolving power, an apparatus of about 300 dpi (dot per inch) can be obtained inexpensively.

An image input apparatus utilizing a video camera instead of the line scanner is also known, as disclosed in the Japanese Patent Application Laid-Open No. 1-126636. Such apparatus is used, for example, for entering an original image in a television conference system.

Also already known are the character recognition technology for converting a character image into a character code according to a predetermined character recognition algorithm, and a configuration combined with an image input apparatus employing a manual or automatic line scanner, as disclosed in Japanese Patent Application Laid-Open No. 4-14957.

In the conversion of the printed information such as a newspaper or a magazine into an electronic file, however, the image information itself requires a large memory capacity. For example such conversion with a vertical-to-horizontal ratio of 1:1 and with 256 density levels requires a memory capacity of about 300 KBytes, and such conversion of a color original requires a capacity of about 600 KBytes. The amount of information increases when the original image is read more finely. A compression only reduces the amount of information to ½ to ⅒, so that there is still required a recording medium of a large capacity.

Also an image reading apparatus in which the original is placed on a table and is read with the line scanner lacks rapidity as the original has to be placed in a predetermined position. Similar drawbacks are encountered in the image reading apparatus in which the line sensor is manually displaced.

SUMMARY OF THE INVENTION

In consideration of the foregoing, an object of the present invention is to provide a data input apparatus and a data processing apparatus capable of suitably compressing the amount of stored information according to the kind of information.

Another object of the present invention is to provide a data input apparatus and a data processing apparatus, capable of significantly reducing the amount of data, by converting a character portion of the input image into character codes by character recognition means.

Still another object of the present invention is to provide a data input apparatus and a data processing apparatus capable of reducing the amount of data of the entire original consisting of characters and graphic patterns, by decreasing the data amount of graphic patterns by vector conversion or by image compression means, in addition to the data amount reduction in the character area.

Still another object of the present invention is to provide a data input apparatus and a data processing apparatus capable of improving the probability of character recognition by the zooming function of a phototaking optical system.

Still another object of the present invention is to provide a data input apparatus and a data processing apparatus capable of easily and rapidly entering image data containing characters and graphic patterns.

The above-mentioned objects can be attained, according to the present invention, by a data input apparatus comprising image pickup means provided with a zooming function and capable of converting an original image into an electrical signal; area judging means for judging at least a character area in an image taken by the image pickup means; character recognition means for converting the character image in the character area judged by said area judging means into a character code; and control means for controlling the zooming function of said image pickup means according to the status of character recognition by said character recognition means, thereby executing the character recognition by an enlarged image. The apparatus of the present invention is further characterized by data reduction means for reducing the data of the image outside the character area in the taken image.

If necessary, the apparatus of the present invention also judges a pattern area and encodes the graphic pattern information. An image with gradation is compressed for example by the JPEG method.

Also the data processing apparatus of the present invention, for compressing an input image information, comprises area judging means for judging at least a character area from said input image information; character recognition means for converting a character image in the character area judged by said area judging means into a character code; image compression means for compressing the information in the area outside said character area; and output process means for releasing the outputs of said character recognition means and of said image compression means in a predetermined format.

Also the data processing apparatus of the present invention comprises a phototaking optical system provided with externally controllable zooming function; image pickup means for converting an original image, formed by said phototaking optical system, into an electrical signal; area judging means for judging at least a character area in the image taken by said image pickup means; character recognition means for converting a character image, in the character area judged by said area judging means, into a character code; control means for controlling the zooming function of said phototaking optical system according to the status of character-recognition by said character recognition means, thereby executing the character recognition with an enlarged image; voice process means for converting the character code, recognized by said character recognition means, into a voice signal and effecting digital compression thereon; data reduction means for effecting data reduction on the image in an area outside the character area in the taken image; and recording means for recording the outputs of said voice process means and said data reduction means on a detachable recording medium.

If necessary, the graphic pattern area is also judged, and the graphic pattern information is encoded. A pattern with gradation is compressed for example by the JPEG method.

BRIEF DESCRIPTION OF THE DRAWINGS

FIG. 17 is a view showing six typical feature patterns of a line figure;

FIG. 30 is a block diagram of a variation of the embodiment shown in FIG. 19.

DETAILED DESCRIPTION OF THE PREFERRED EMBODIMENTS

Now the present invention will be clarified in detail by preferred embodiments thereof shown in the attached drawings.

Figure 1:
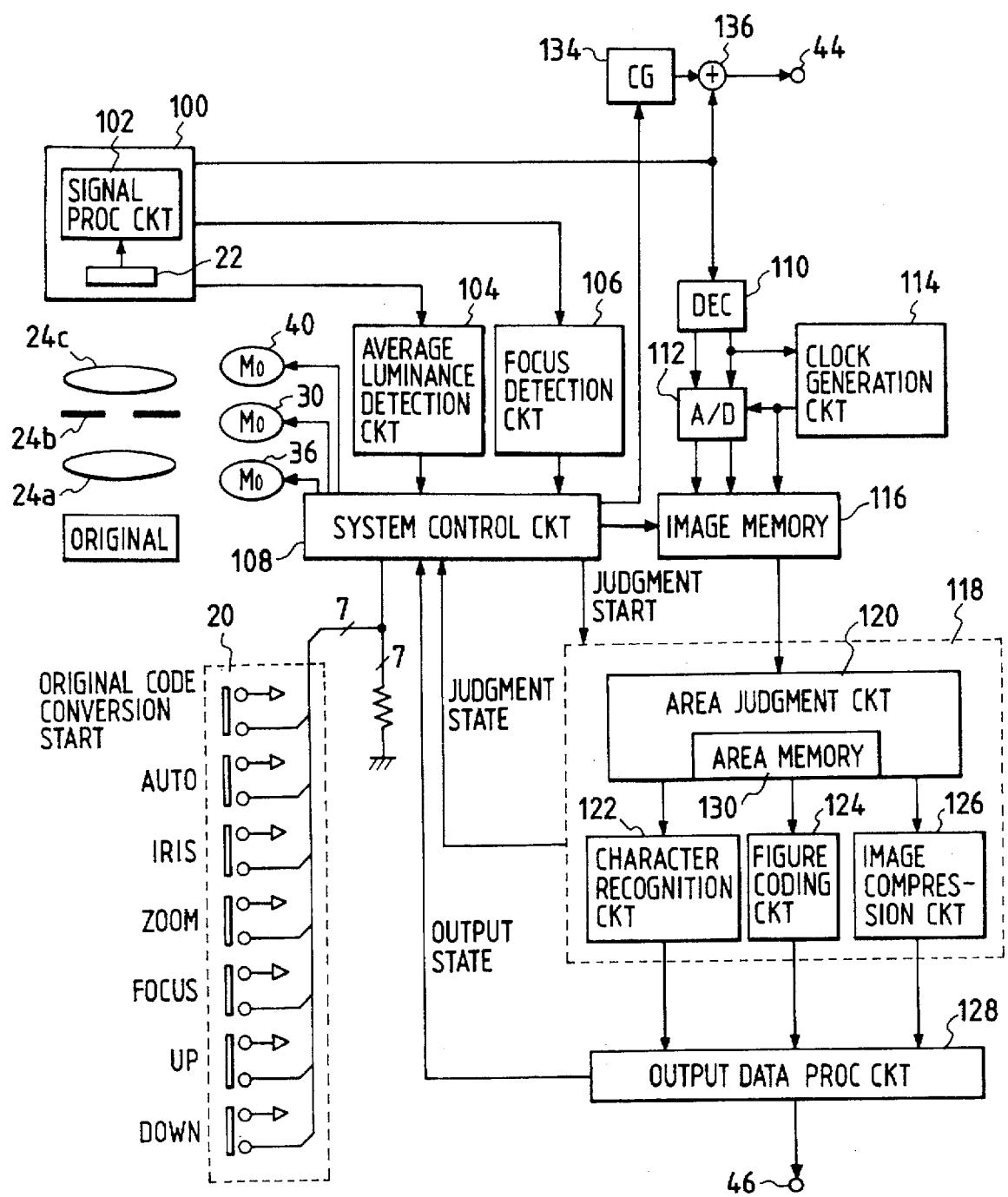
FIG. 1 is a block diagram of an embodiment of the present invention.
Figure 2:
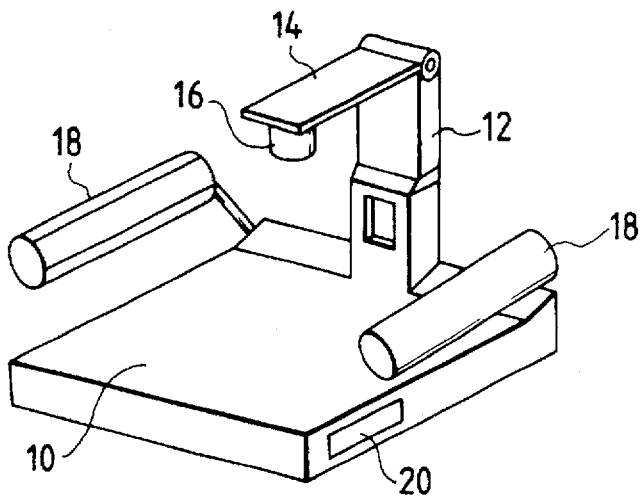
FIG. 2 is an external perspective view of said embodiment.
Figure 3:
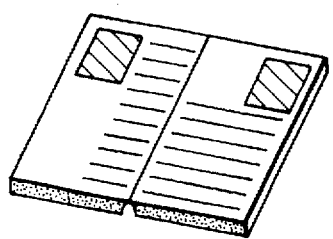
FIG. 3 is a perspective view of an original.
Figure 4:
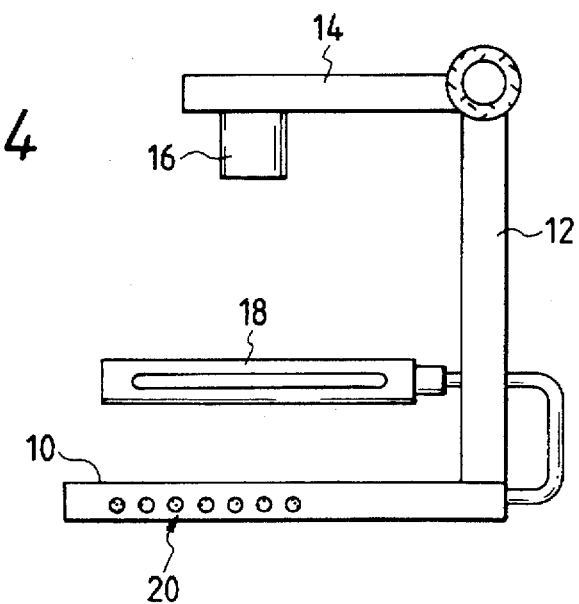
FIG. 4 is a cross-sectional view of said embodiment at the center thereof.
Figure 5:
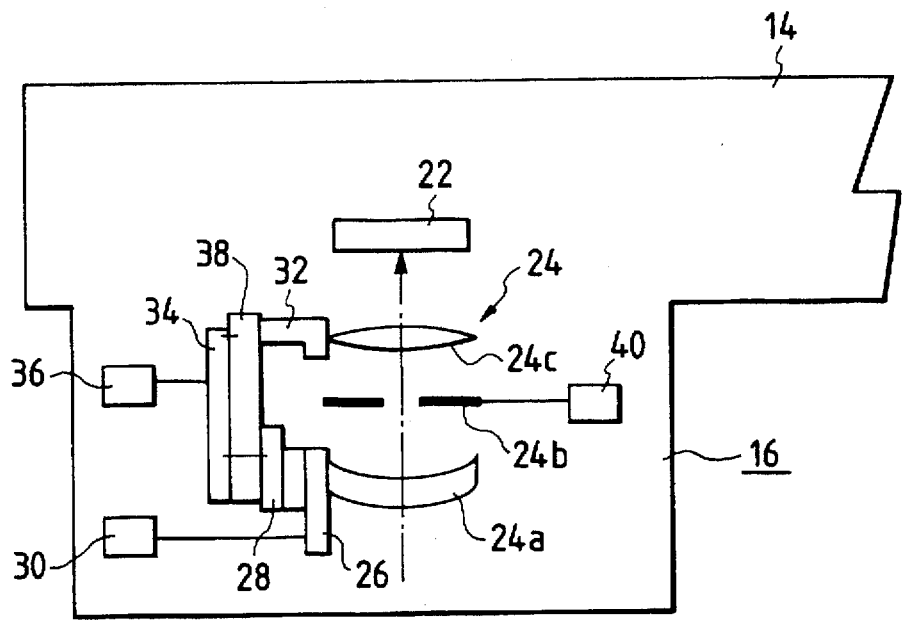
FIG. 5 is a cross-sectional view of the optical system of a camera 16 in said embodiment.
Figure 6:
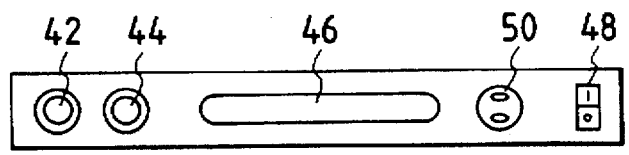
FIG. 6 is a view of connecting terminals at the back of said embodiment.

FIG. 1 is a schematic block diagram of the electric circuits of an embodiment of the present invention; FIG. 2 is an external perspective view of said embodiment; FIG. 3 is a perspective view of an original to be read; FIG. 4 is a cross-sectional view of said embodiment at the center thereof; FIG. 5 is a cross-sectional view of a reading optical system; and FIG. 6 is a view showing the back of said embodiment having connecting terminals.

At first there will be explained the external view. As shown in FIG. 2, a vertical support member 12 stands at the rear part of an original table 10, and supports a camera 16 by a horizontal support member 14 at the upper end. On both sides of said camera 16, illuminating devices 18 are provided for illuminating an original placed on the original table 10. On said table 10, the original is placed in an open state, as shown in FIG. 3.

On a lateral face of the original table 10 provided is an operation unit 20, having seven switches, of which functions will be explained later.

In the camera 16 there are provided, as shown in FIG. 5, a CCD image sensor 22 for converting the optical image into an electrical signal, and a photo-taking optical system 24 for focusing the image of the original, placed on the original table 10, onto the image sensor 22. The phototaking optical system 24 includes at least a focusing lens 24a, an iris 24b and a zooming lens 24c.

The focusing lens 24a is fixed on a focusing frame 26 which is rendered movable with respect to a movable tube 28. A motor 30 is provided for axially moving the focusing frame 26 with respect to the movable tube 28.

The zooming lens 24c is fixed on a movable tube 32 which is axially moved by the rotation of a cam tube 34. A zooming motor 36 is provided for rotating the cam tube 34 with respect to a fixed tube 38. The movable tube 28 is also axially driven by the rotation of the cam tube 34. Thus, by the rotation of the zooming motor 36, the focusing lens 24a and the zooming lens 24c are axially moved in mutual linkage, in order to compensate for the focusing error resulting from the zooming operation.

A motor 40 is provided for opening or closing the iris 24b.

The motors 30, 36, 40 may be composed for example of DC motors, stepping motors or ultrasonic motors. For the purpose of simplicity, they are assumed as stepping motors in the following description.

The above-mentioned driving mechanisms for focusing, zooming and for iris are already known in the field of zoom lenses for use in conventional cameras employing silver halide based films.

At the back of the image input apparatus of the present embodiment, there are provided, as shown in FIG. 6, an external input terminal 42, a video output terminal 44, a digital data output terminal 46, a power switch 48 and a connection terminal 50 for a power supply cable.

Figure 7:
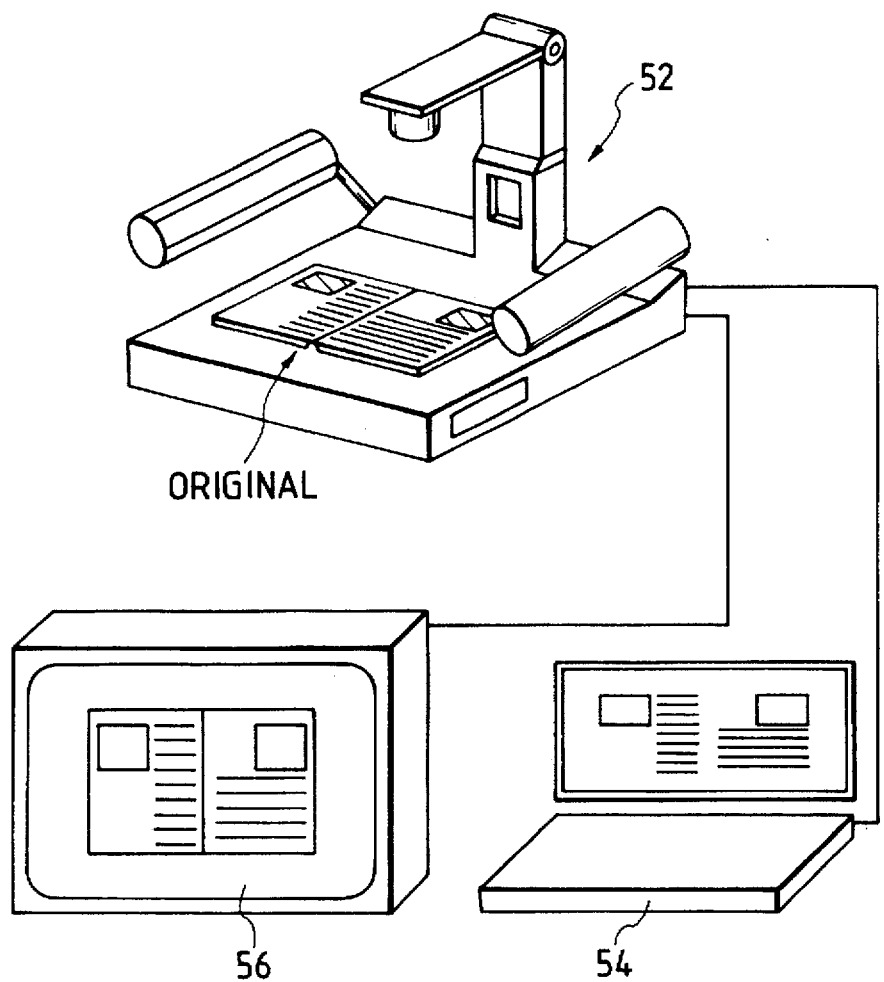
FIG. 7 is a view showing an example of connection of said embodiment.

FIG. 7 shows an example of a configuration in which the image input apparatus of the present embodiment is utilized. A data input apparatus 52 of the present embodiment is connected, by the digital data output terminal 46, to a computer 54, and by the video output terminal 44, to a monitor 56.

In the following the circuit configuration of the present embodiment will be explained with reference to FIG. 1. In FIGS. 1 to 6, same components are represented by same symbols.

An interchangeable camera head 100, mounted at the end of the horizontal supporting member 14, is provided therein with an image sensor 22 and a signal processing circuit 102 for converting the output of said image sensor 22 into a video signal. There are also provided an average luminance detection circuit 104 for calculating the average luminance, within the effective image area, of a field or a frame, from the output luminance signal of the signal processing circuit 102, and a focus detection circuit 106 for extracting predetermined high frequency components from a central portion of the effective image area of a field or a frame, from the output luminance signal of the signal processing circuit 102 and releasing the integrated value of said components.

A system control circuit 108 controls the entire system including the motors 30, 36, 40, and the user can enter instructions by the switches of the operation unit 20. The system control circuit 108 normally controls the iris 24b, by driving the motor 40 according to the detection output of the average luminance detection circuit 104. Also it controls the motor 30 so as to attain a focused state, according to the output of the focus detection circuit 106. Also it effects zooming by controlling the zooming motor 36 according to the area judgment to be explained later or to the judgment state signal at the character recognition.

When a manual regulation mode is selected by the operation unit 20 for the focusing lens 24a, iris 24b and/or zooming lens 24c, the system control circuit 108 drives the motor 30, 36 and/or 40 in response to the actuation of an up switch or a down switch, for the selected control object.

There are further provided a decoder 110 for separating the video signal from the camera head 102 into a luminance signal and color difference signals; an A/D converter 112 for digitizing the luminance and color difference signals from the decoder 110; a clock generation circuit 114 for extracting a synchronization signal from the output luminance signal of the decoder 110, thereby generating a sampling clock signal for the A/D converter 112; and an image memory 116 for storing the luminance and color difference data from the A/D converter 112, according to the clock signal from the clock generation circuit 114.

An encoding circuit 118 is provided for referring to the image data stored in the image memory 116, judging a character area, a gradation image area, a graphic pattern area and a blank area, and effecting code conversion of the information in each area. Said encoding circuit 118 is practically composed of a microcomputer or a digital signal processor (DSP) and is realized by a software, but is functionally provided, as shown in FIG. 1, with an area judging circuit 120, a character recognition circuit 122, a graphic pattern encoding circuit 124 and an image compression circuit 126. An output data processing circuit 128 is provided for forming the output of the encoding circuit 118 into a predetermined format. The area judging circuit 120 is provided therein with an area memory circuit for memorizing the coordinates of the judged areas.

The video output signal of the camera head 100 is supplied, through an adder 136, to the video output terminal 44. A character generator (CG) 134 generates a character pattern signal according to the instruction from the system control circuit 108, and the adder 136 adds said character pattern signal from the character generator 134 to the video output signal from the camera head 100.

The focusing control operation will be briefly explained. The luminance signal from the camera head 100 is also supplied to the focus detection circuit 106, which extracts predetermined high frequency components from a central portion of the image area of the entered luminance signal, then integrates said high frequency components for the period of a vertical synchronization, and sends the digitized integrated value to the system control circuit 108. The system control circuit 108 drives the motor 30 so as to maximize the output of the focus detection circuit 106 by the mountain climbing method.

When the manual regulation mode for the focusing lens 24a is selected by the operation unit 20, the system control circuit 108 drives the motor 30 in the forward or reverse direction, in response to the actuation of the up switch or the down switch provided in the operation unit 20.

Then the iris control operation will be briefly explained. The camera head 100 sends the video signal of the original image to the decoder 110 and the adder 136, and also sends the luminance signal of said original image to the average luminance detection circuit 104. Said detection circuit 104 integrates the entered luminance signal within the effective image area, over a vertical synchronization period, and the digitized integrated value to the system control circuit 108.

When a full automatic mode is selected by the operation unit 20, the system control circuit 108 compares the average luminance supplied from the average luminance detection circuit 104 with a threshold value, and controls the motor 40 according to the result of said comparison. More specifically, the iris 24b is maintained at the current state if the average luminance is equal to said threshold value within a predetermined tolerance; but the iris 24b is opened or closed if said average luminance is respectively larger or smaller than said threshold value.

When the manual regulation of the iris 24b is selected by the operation unit 20, the system control circuit opens or closes the iris 24b in response to the actuation of the up switch or the down switch provided in the operation unit 20.

Now the zooming control operation will be explained briefly. In the course of area judgment and encoding of the original image data, the system control circuit 108 controls the motor 36 so as to facilitate said area judgment and encoding, according to a judgment status signal from the encoding circuit 118. The details of this process will be explained later.

When the manual regulation mode is selected for the zooming lens 24c by the operation unit 20, the system control circuit 108 drives the motor 36 in the forward or reverse direction, according to the actuation of the up switch or the down switch in the operation unit 20.

The output video signal of the camera head 100 is supplied to the adder 136, which also receives the character pattern signal generated by the character generator 134 according to the instruction from the system control circuit 108, whereby the adder 136 supplies the video output terminal 44 with a video signal of the original image on which the characters from the character generator 134 are superposed. Thus the monitor 56, connected to said video output terminal 44, displays the image of the original, on which the characters from the character generator 134 are superposed.

The output video signal of the camera head 100 is also supplied to the decoder 110, which separates the entered video signal into a luminance signal and color difference signals, for supply to the A/D converter 112. The clock generation circuit 114 generates, from the synchronization signal superposed in the luminance signal released from the decoder 110, a sampling clock signal for the A/D converter 112 and a writing clock signal for the image memory 116. The A/D converter 112 converts the luminance signal and the color difference signals from the decoder 110 for example into an 8-bit digital signal, according to the clock signal from the clock generation circuit 114.

The system control circuit 108 sends a writing start signal to the image memory 116, which in response stores the output of the A/D converter 112, namely the luminance and color difference data, according to the clock signal from the clock generation circuit 114. Also in response to a judgment start signal from the system control circuit 108, the encoding circuit 118 initiates the area judgment and the code conversion.

The area judgment circuit 120 judges the character area, graphic pattern area, gradation image area and blank area, and the coordinate data of each area are temporarily stored in the area memory circuit 130. The character recognition circuit 122, the pattern encoding circuit 124 and the image compression circuit 126 check the presence or absence of the object of processing by referring to said area memory circuit 130, then read necessary image data from the image memory 116, and respectively effect character recognition, pattern encoding and image compression, for supply of the result to the output data processing circuit 128. The output formats of the character recognition circuit 122, the graphic pattern encoding circuit 124 and the image compression circuit 126 are respectively shown in FIGS. 8, 9 and 10. The output data processing circuit 128 regulates these data into a predetermined format, for supply to the output terminal 46.

The character recognition circuit 122 extracts each character from the character area, and recognizes the character for example by the pattern matching method or the feature extraction method. The extraction of character can be achieved for example by the projection method. The character recognition circuit 122 supplies the output data processing circuit 128 with the code signal of the recognized character, together with the font information, in the format shown in FIG. 8.

Figure 11A:
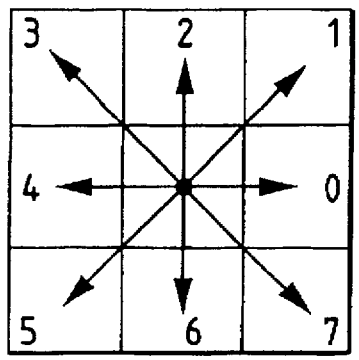
FIGS. 11A and 11B are views showing the principle of chain encoding in the pattern encoding circuit 124.
Figure 11B:
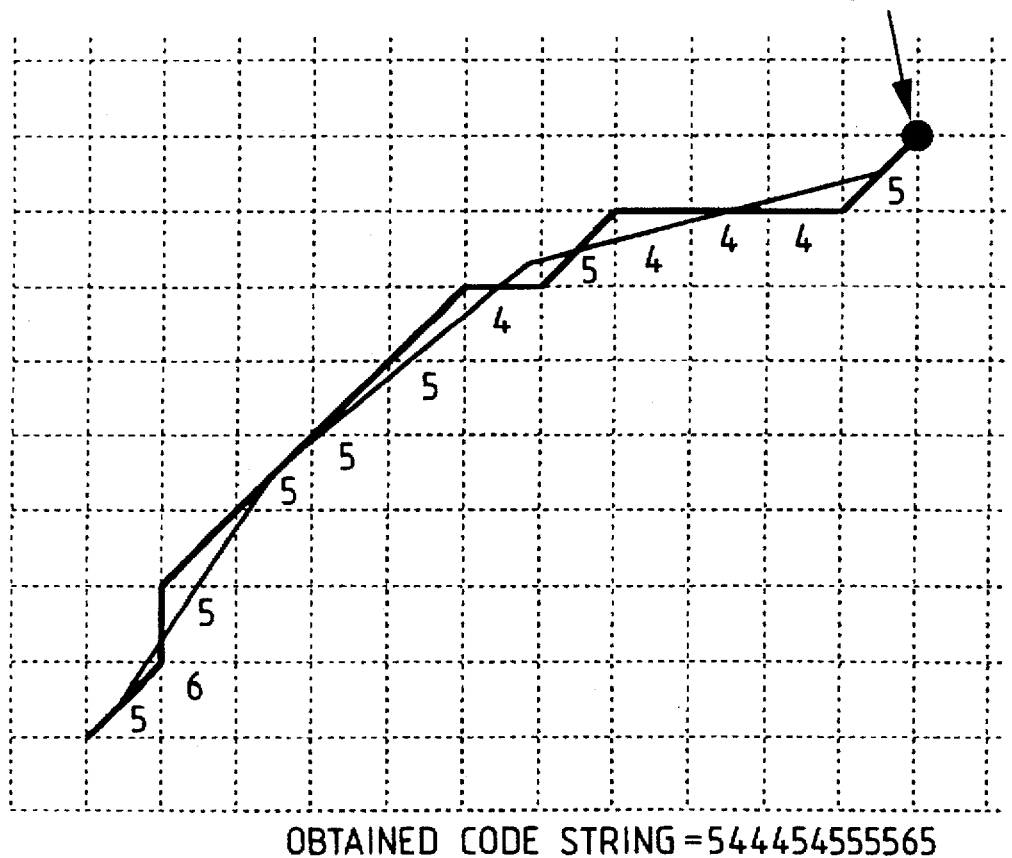

The graphic pattern encoding circuit 124 encodes the graphic pattern for example by the chain code method. In said method, the boundary of an image or a line pattern is approximated by folded line portions, as exemplified in FIGS. 11A to 11C. Unit vectors of eight different directions are given different numbers as shown in FIG. 11A, and a line pattern as shown in FIG. 11B is approximated by the unit vectors shown in FIG. 11A. A code is obtained by a train of the numbers of the adopted unit vectors. The encoding circuit 124 supplies the output data processing circuit 128 with the obtained code train in the format shown in FIG. 9.

The image data of the gradation image area may become enormous if they are released in the original form. Consequently the image compression circuit 126 compresses the data amount several times for example by the JPEG (Joint Photographic coding Experts Group) method. Said compression can be achieved by a digital signal processor (DSP), an exclusive IC or a software calculation. Said circuit 126 supplies the output data processing circuit 128 with the compressed image data in the format shown in FIG. 10.

Figure 8:
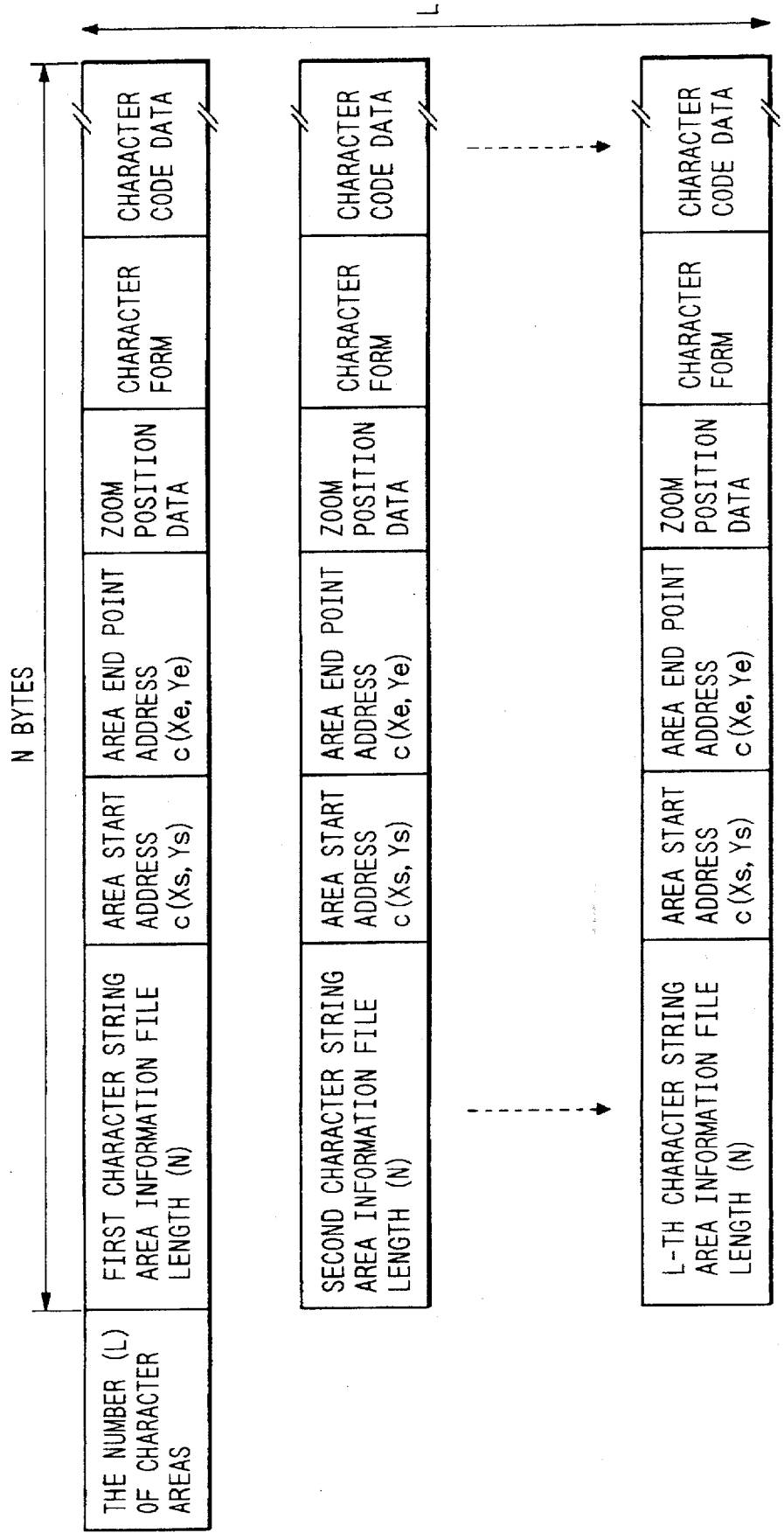
FIG. 8 is a view showing the output format of a character recognition circuit 122.
Figure 9:
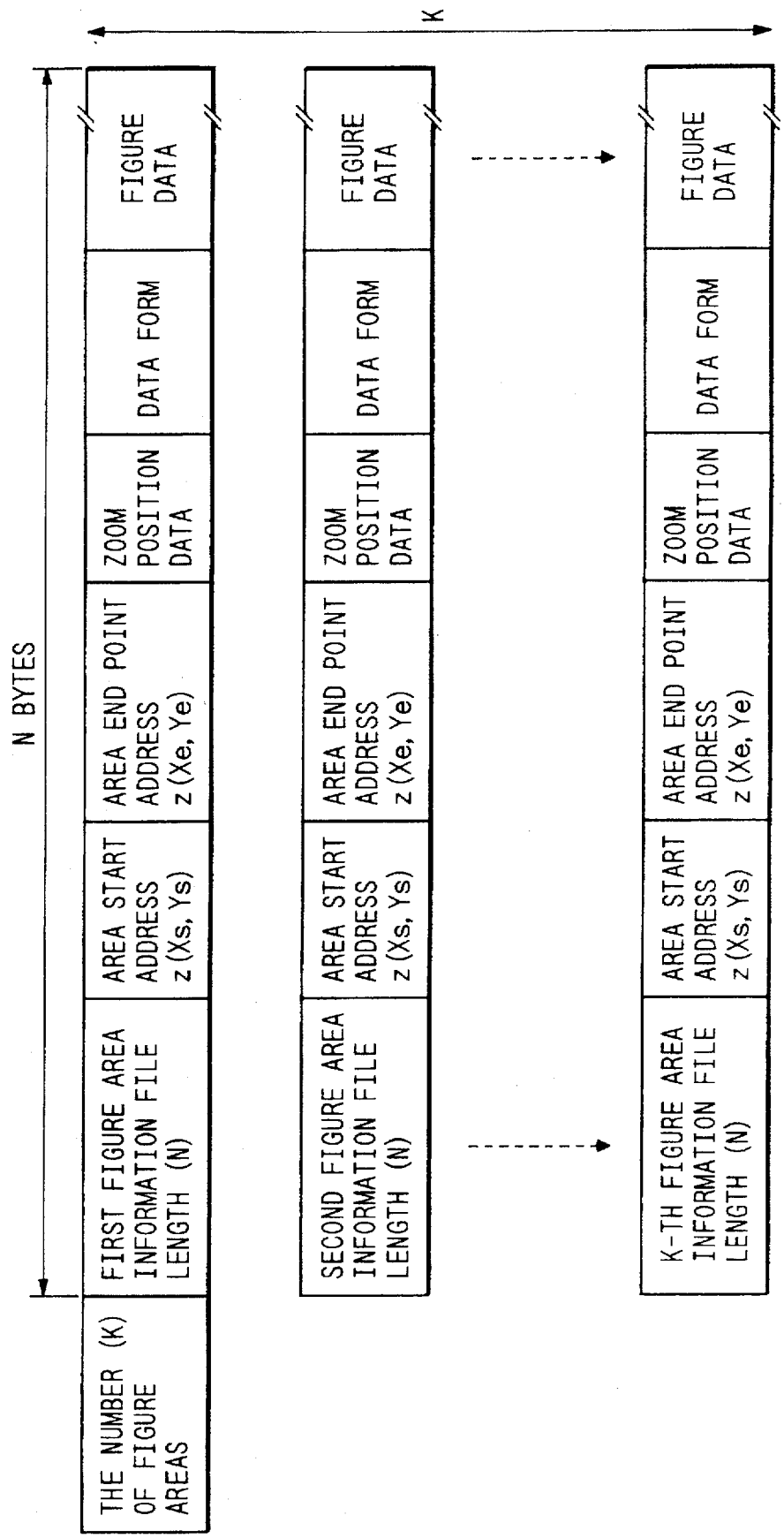
FIG. 9 is a view showing the output format of a pattern encoding circuit 124.
Figure 10:
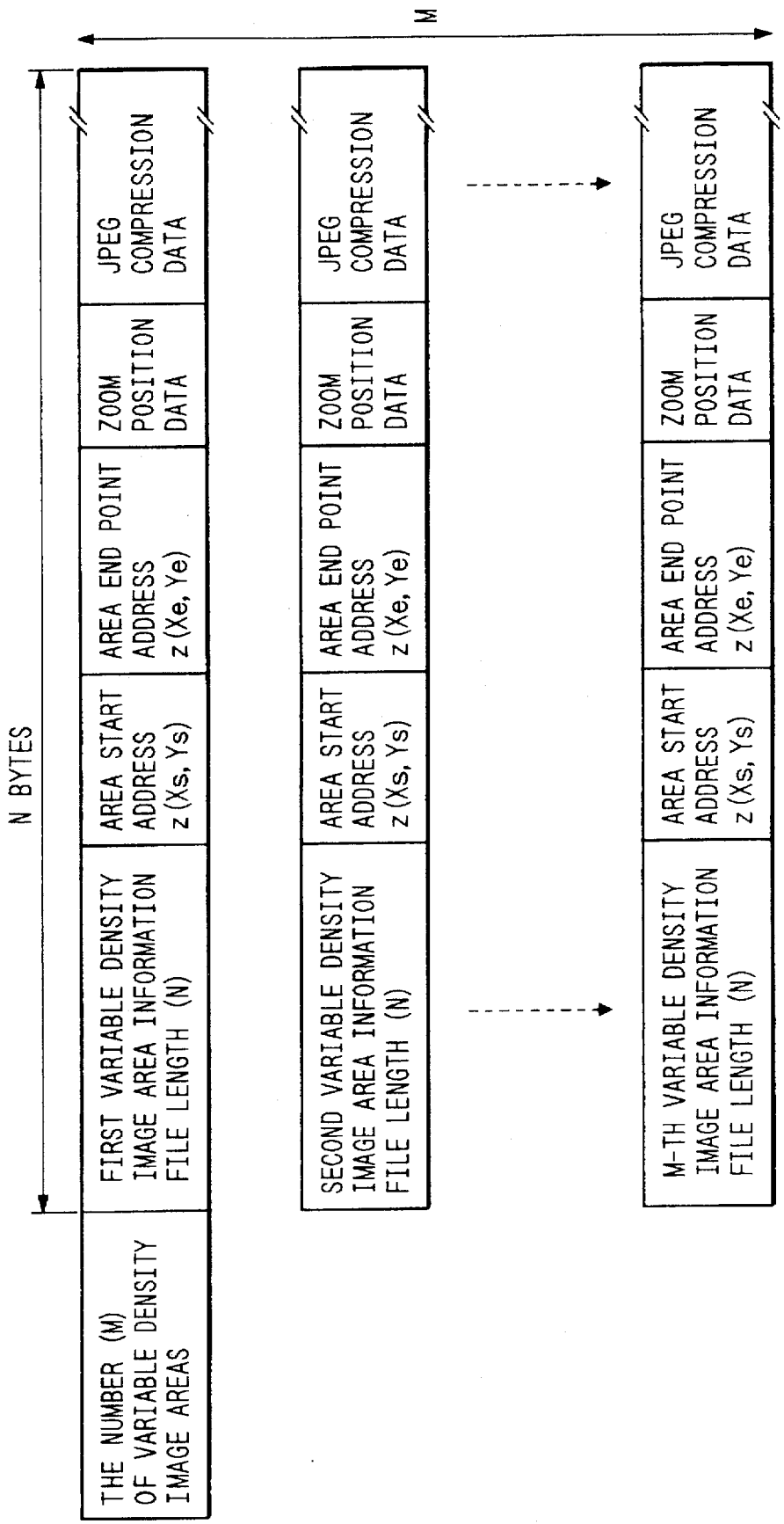
FIG. 10 is a view showing the output format of an image compression circuit 126.

The output data processing circuit 128 sends the data from the circuits 122, 124, 126 to the output terminal 46, after converting to a known image data format such as TIFF (Tag Image File Format) or PICT, or an independent format. The zoom position information shown in FIGS. 8, 9 and 10 is used as a parameter in converting the resolving power (dot per inch) in original reading.

In the following there will be explained the operations from the original reading to the completion of data output, with reference to flow charts shown in FIGS. 12 to 14. An original is placed on the original table 10, and an original part to be entered is opened (S1). The system control circuit 108 controls the iris 24b by the motor 40 as explained before (S2), and also controls the focusing lens 24a by the motor 30 (S3). An original code conversion start switch of the operation unit 20 is actuated (S4) to clear a zooming counter variable K (S5).

After the focusing operation is completed (S6), the system control circuit 108 instructs the image memory 116 to fetch the image data (S7). In response the image memory 116 fetches the luminance and color difference data released from the A/D converter in the above-explained manner (S8). After the completion of said fetching, the system control circuit 108 sends a judgment start signal to the area judgment circuit 120 of the encoding circuit 118 (S9). In response, the area judgment circuit 120 reads the pixel data in succession from the image memory 116, then judges the character area, graphic pattern area, gradation image area and blank area, and stores the address (coordinate) information of said areas in the area memory circuit 130 (S10).

After the completion of area judgment (S11), if a character area is present (S12), the area judgment circuit 120 supplies the character recognition circuit 122 with the address information of said character area, and connects the output data bus of the image memory 116 to the character recognition circuit 122 (S13). The character recognition circuit 122 effects the character recognition (S14), and informs the system control circuit 108 of the probability of recognition (S15). If said probability exceeds a predetermined threshold value Rt (S16), the character recognition circuit 122 temporarily stores the character code data in an internal memory, and, after the completion of character recognition, sends said data to the output data process circuit 128 in the format shown in FIG. 8 (S17).

If said probability does not exceed the threshold value Rt (S16), the system control circuit 108 displaces the zooming lens 24c by a predetermined amount by means of the zooming motor 36, thereby enlarging the original image (S18). Then the variable K is increased by a step (S19), and, if it does not exceed a maximum value Kmax (S20), the character recognition after the step S7 is repeated after the repeated focusing operation. If the character recognition provides plural candidate characters, a candidate may be determined by majority, in consideration also of the result of character recognition at different zoom positions.

If K exceeds Kmax (S20), the character generator 134 and the adder 132 displays an alarm indicating that the recognition is impossible on the monitor 56, and the output data process circuit 128 sends data indicating that the recognition is impossible to the digital data output terminal 46 (S21).

If the character area is not present (S12) or if the character area is present but the character recognition therefor is completed (S17, S21), the gradation image area is processed. If a gradation image area is present (S22), the area judgment circuit 120 sends the address information thereof to the image compression circuit 126 and connects the output data bus of the image memory 116 to the image compression circuit 126. Said circuit 126 compressed the gradation image for example by the JPEG method (S23), then temporarily stores the compressed data in the internal memory, and releases said data to the output data process circuit 128 in the format shown in FIG. 10 (S24).

Then, if a graphic pattern area is present (S25), the area judgment circuit 120 sends the address information thereof to the encoding circuit 124, and connects the output data bus of the image memory 116 to said encoding circuit 124. The encoding circuit 124 encodes the image in said graphic pattern area (S26), then temporarily stores the encoded data and sends said data to the output data process circuit 128 in the format shown in FIG. 9 (S27).

The output data process circuit 128 regulates the data from the character recognition circuit 122, graphic pattern encoding circuit 124 and image compression circuit 126 into predetermined formats and sends said data in succession to the output terminal 46 (S28, S29, S30). After the completion of data output, the output data process circuit 128 informs the system control circuit 108 of said completion by an output status signal, and the system control circuit 108 causes the character generator 134 and the adder 136 to display the completion of output on the monitor 56 (S31).

For the ease of explanation, the character recognition, gradation image compression and graphic pattern encoding are assumed to be executed in this order, but these operations are preferably conducted in as parallel as possible, and such parallel execution is rendered possible by sending necessary image data to the circuits 122, 124, 126 prior to the execution.

In the following the details of area judgment by the area judgment circuit 120 will be explained. The printed original is basically composed of characters, graphic patterns (binary density levels), gradation images (multiple density levels) and blank (background) areas. In the present embodiment, the gradation image area is at first separated, and the graphic pattern area and the character area are then separated.

Figure 15:
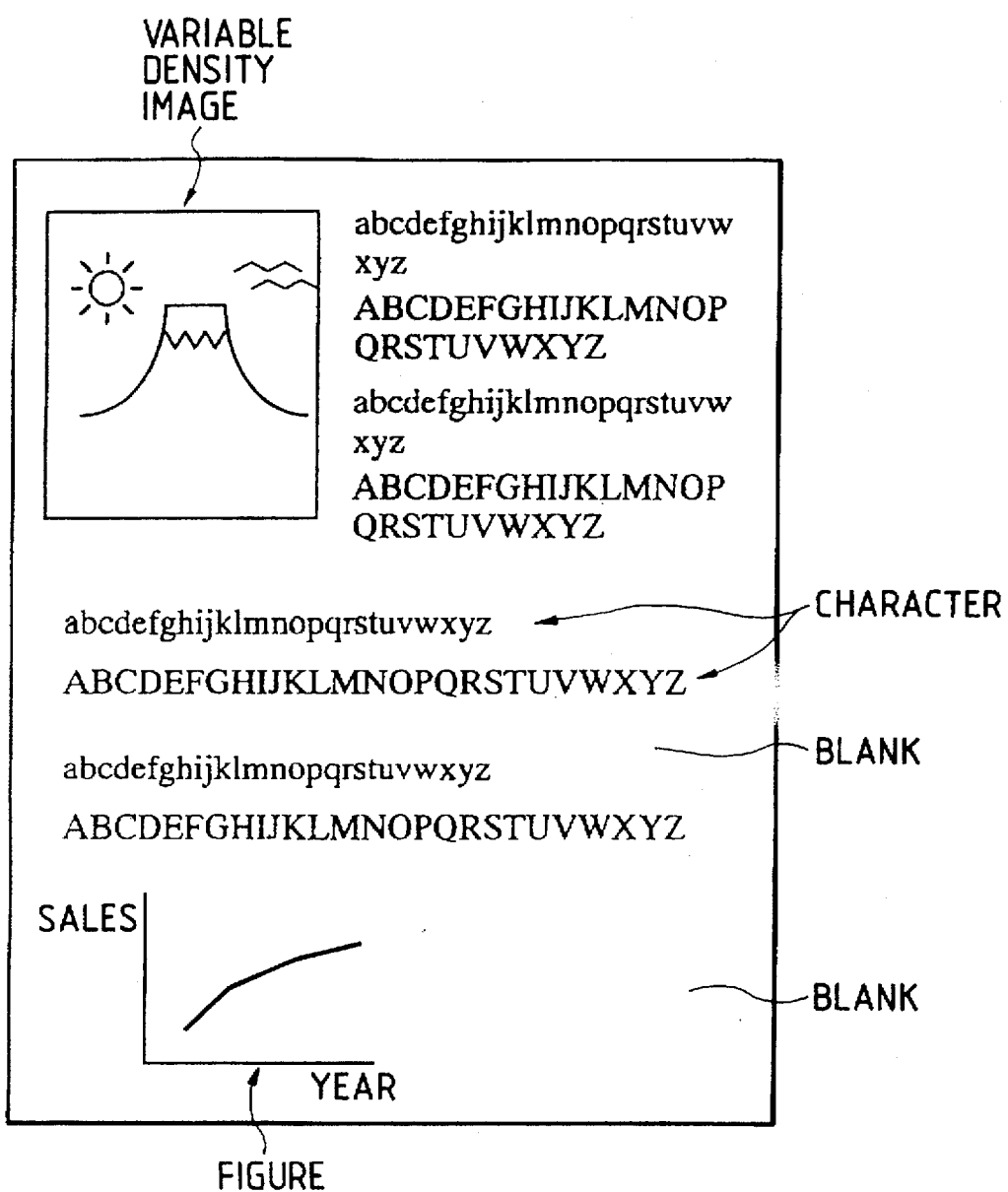
FIG. 15 is a view showing an example of the original image.
Figure 16A:
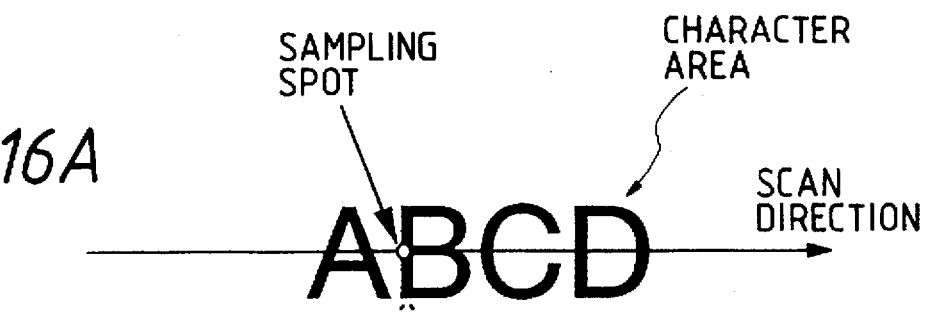
FIGS. 16A, 16B and 16C are views showing the principle of sampling spot scanning method.
Figure 16B:
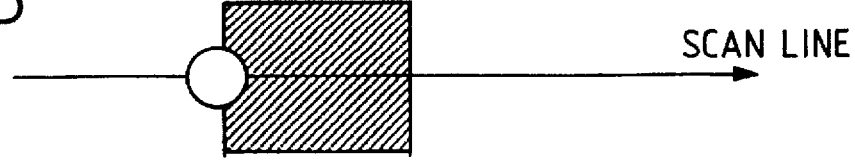
Figure 16C:
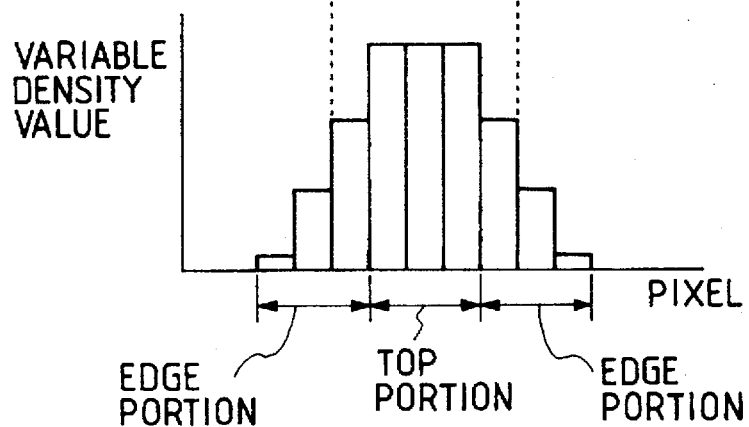

The gradation image area is separated from the character and graphic pattern areas in the following manner. The gradation image contains an intermediate density level. As an example, let us consider an original image as shown in FIG. 15. Namely, let us assume that image data involving gradation as shown in FIG. 15 are stored in the image memory 116. Said image data are scanned, as shown in FIG. 16A, in the direction of scanning line, by a sampling spot of a predetermined size. FIGS. 16A to 16C illustrate a case of scanning of a character area, wherein FIG. 16B is a magnified view of FIG. 16A, and FIG. 16C shows a density distribution obtained by said sampling spot.

When said density distribution is observed through a 3×3 mask, a line pattern matches one of six feature patterns shown in FIG. 17, wherein W indicates white, B indicates black, and M1 and M2 indicate intermediate densities classified by a threshold value. Thus, if the density distribution does not match any of said six feature patterns shown in FIG. 17, the image area in question can be identified as a gradation image, and the gradation image area can be specified by the scanning in the horizontal and vertical directions.

In this manner the gradation image area can be judged at first. Then the graphic pattern area and the character area can be separated in the following manner. The area outside the gradation image area is binarized with a suitable threshold value. Thus obtained binary image is at first scanned in the horizontal direction, and the pixles are grouped by replacing a white image shorter than a predetermined length Lt with a black image. An area limited by white image can be specified by conducting such grouping also in the vertical direction, and such area constitutes a character area or a graphic pattern area. Since the character area is usually rectangular, the graphic pattern area and the character area can be distinguished by certain feature values such as the vertical-to-horizontal ratio or the average black image length. The character area is usually defined by the unit of a row.

An area with consecutive white pixels, outside thus specified gradation image area, graphic pattern area and character area, is defined as the blank area.

Figure 18:
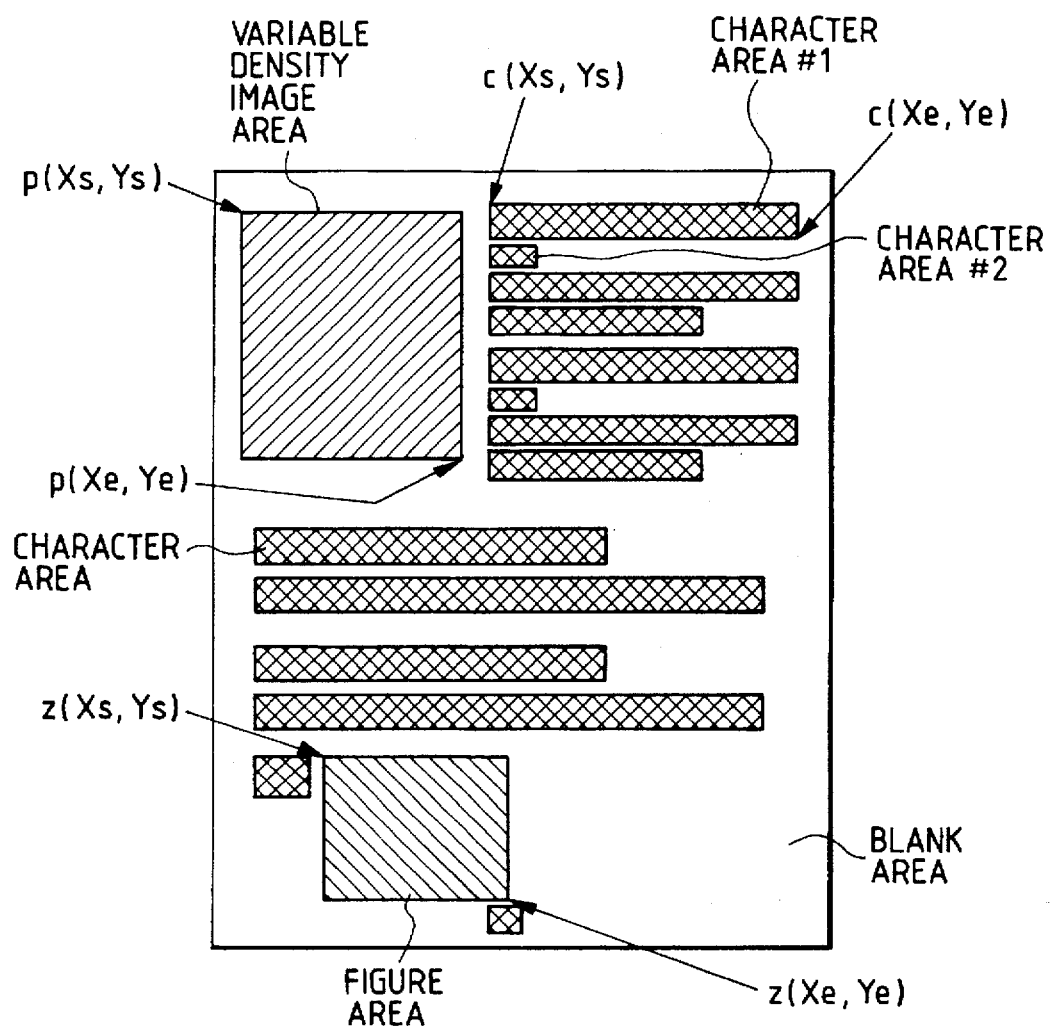
FIG. 18 is a view showing the result of area judgment for the original image shown in FIG. 15.

FIG. 18 shows the result of area judgment on the original image shown in FIG. 15. The start and end addresses of each area, and the classification of the gradation image area, graphic pattern area and character area are memorized in the area memory circuit 130.

In the present embodiment, the areas are judged by the scanning with a sampling spot, but the character and graphic pattern areas can be separated from others, by the density distribution of the peripheral pixels around an object pixel, based on the absence of gray level in such areas.

Also in the present embodiment, for an original image containing characters, graphic patterns and gradation images in mixed manner, there are executed character recognition, graphic pattern encoding and gradation image compression, but a reduction in the data amount is achievable by only one of these operations. Thus the case of executing the character recognition only, or the case of executing the character recognition and the graphic pattern encoding is also included in the present invention.

The above-explained embodiment enables data input with a significant compression of the information of the original image, thus allowing to file the information in a smaller file and enabling easier handling. Also if the probability of character recognition is low, the character recognition is executed with an image enlarged by zooming, so that said probability can be elevated and the manual correction can be reduced. Consequently the data input operation requires manpower merely in the page flipping of the originals, thus saving manpower.

In the above-explained embodiment, the entered and converted data are released from the output terminal for supply for example to a computer or the like, but there may be provided a driving device for a detachable external memory medium (floppy disk, memory card, rigid disk 7 or a magnetooptical disk) and the processed data may be stored in such memory medium. In this manner the data input and the filing of the entered data may be conducted in different locations and in different times.

Furthermore, there may be incorporated a voice synthesis circuit, for generating a voice signal of the recognized characters. In such case, the conversion to the voice signal may be conducted at the data input or at the retrieval or reproduction after said input. In the following there will be explained an embodiment in which a function for converting the character code into a voice signal is incorporated in the data input apparatus and the voice signal is stored in an external memory device after digital compression.

Figure 19:
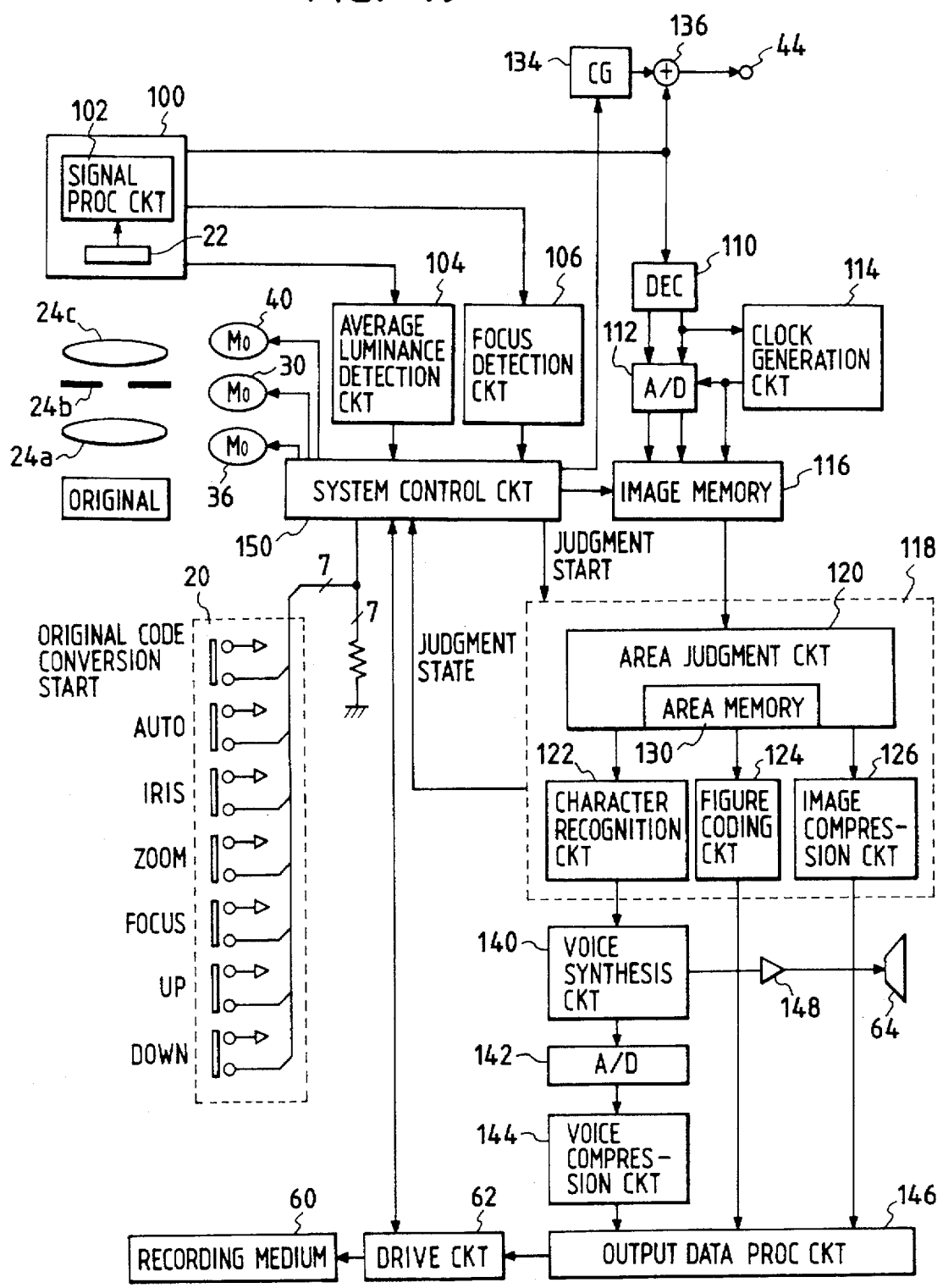
FIG. 19 is a block diagram of another embodiment of the present invention.
Figure 20:
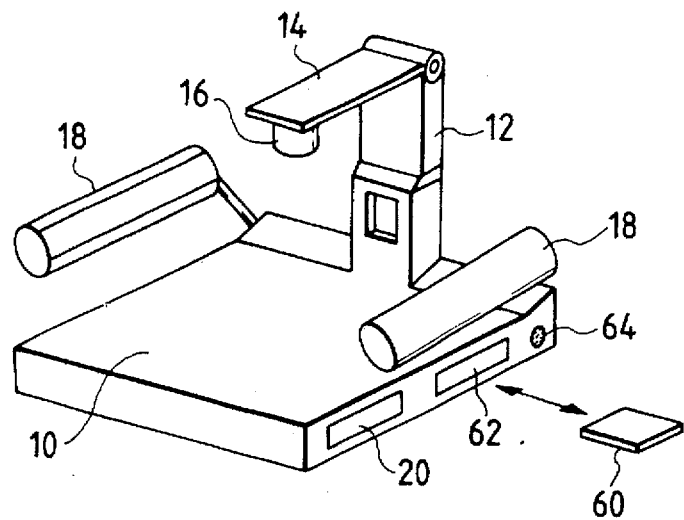
FIG. 20 is an external perspective view of the embodiment shown in FIG. 19.
Figure 21:
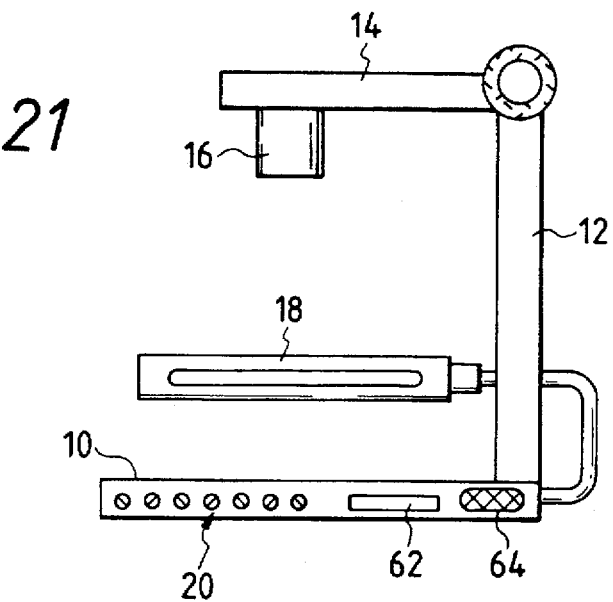
FIG. 21 is a cross-sectional view of the embodiment shown in FIG. 19 at the center thereof.
Figure 22:
FIG. 22 is a view showing connecting terminals at the back of the embodiment shown in FIG. 19.

FIG. 19 is a block diagram of said embodiment, FIG. 20 is an external prespective view, FIG. 21 is a cross-sectional view thereof at the center, and FIG. 22 is a view showing the arrangement of connecting terminals at the back of said embodiment. In these drawings, same components as those shown in FIGS. 1 to 18 are represented by same symbols.

As shown in FIGS. 20 and 21, a driving device 62 for a floppy disk 60 and a loud speaker 64 are incorporated at a lateral face. Also as shown in FIG. 22, the digital data output terminal 46 is omitted as it is no longer required, though it may naturally be still provided.

Figure 23:
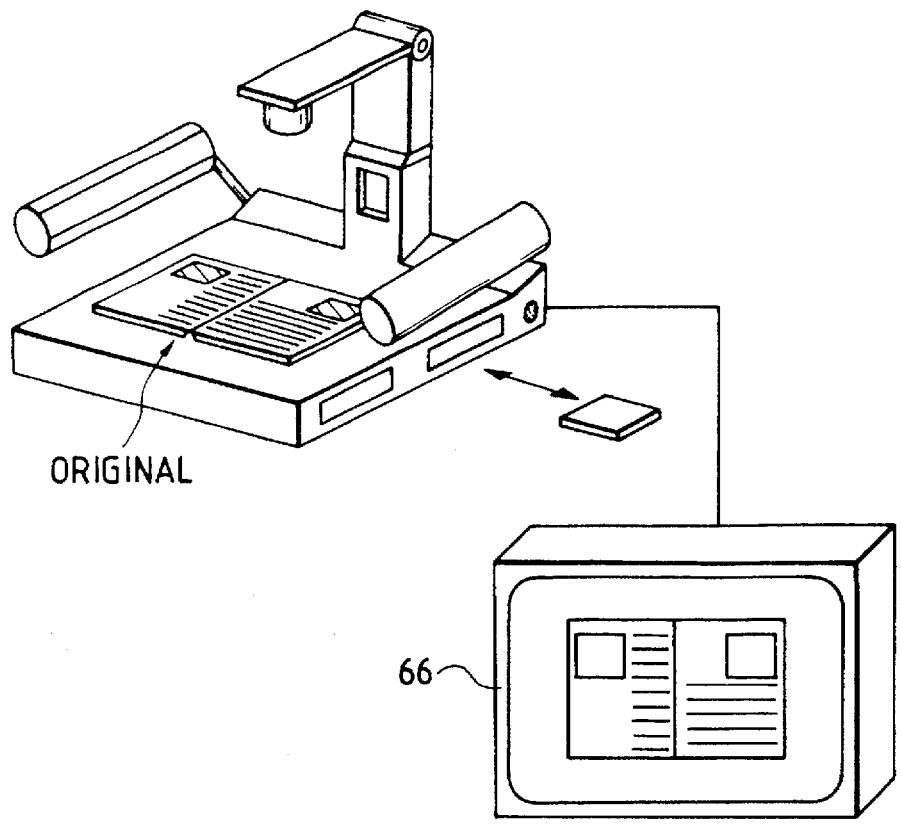
FIG. 23 is a view showing an example of connections of the embodiment shown in FIG. 19.

FIG. 23 shows the configuration of the present embodiment at use. A monitor 66 is connected to the video output terminal of the data input apparatus of the present embodiment.

In the following explained are modified portions in FIG. 19. A voice synthesis circuit 140, of which details will be explained later, converts the character code train, released from the character recognition circuit 122, into an analog voice signal. There are also provided an A/D converter 142 for digitizing the analog voice signal released from the voice synthesis circuit 140; a voice compression circuit 144 for compressing the voice data released from the A/D converter 142; an output data process circuit 146 for adjusting the outputs of the voice compression circuit 144, graphic pattern encoding circuit 124 and image compression circuit 126 into predetermined formats; a driving circuit 62 for recording the output of the output data process circuit 146 on a floppy disk 60; and an amplifier 148 for amplifying the output voice signal of the voice synthesis circuit 140 for supply to the speaker 64.

A system control circuit 150 controls the voice synthesis circuit 140 and the driving circuit 62, in addition to the functions of the aforementioned system control circuit 108.

In the embodiment shown in FIG. 19, the characters are converted by the character recognition circuit 122 into character codes, which are converted by the voice synthesis circuit 140 into an analog voice signal. Said analog voice signal is amplified by the amplifier 148 and released from the speaker 64, whereby the user can acoustically confirm the result of character recognition.

The voice signal from the voice synthesis circuit 140 is also digitized by the A/D converter 142 and compressed by the voice compression circuit 144, for example by the ADPCM (adaptive differential pulse code modulation) method of the sub band coding method.

The output data process circuit 146 adjusts the outputs of the circuits 144, 124, 126 into a predetermined format (for example voice format of the MIDI (Musical Instrument Digital Interface) standard, MPEG (Moving Picture Expert Group) standard, or CDI (Compact Disk Interactive) standard) for supply to the driving circuit 62, which records thus supplied data on the floppy disk 60.

Figure 24:
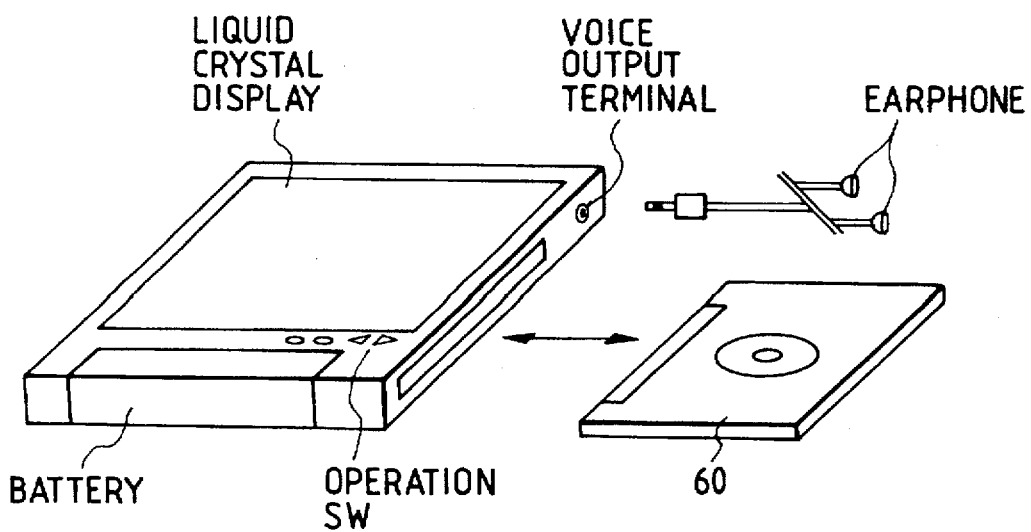
FIG. 24 is an external perspective view of a reproducing device for the information recorded on a floppy disk 60.

The information recorded on the floppy disk 60 can be easily reproduced by a reproducing apparatus equipped with an image display unit and a voice output terminal, as shown in FIG. 24.

Figure 25:
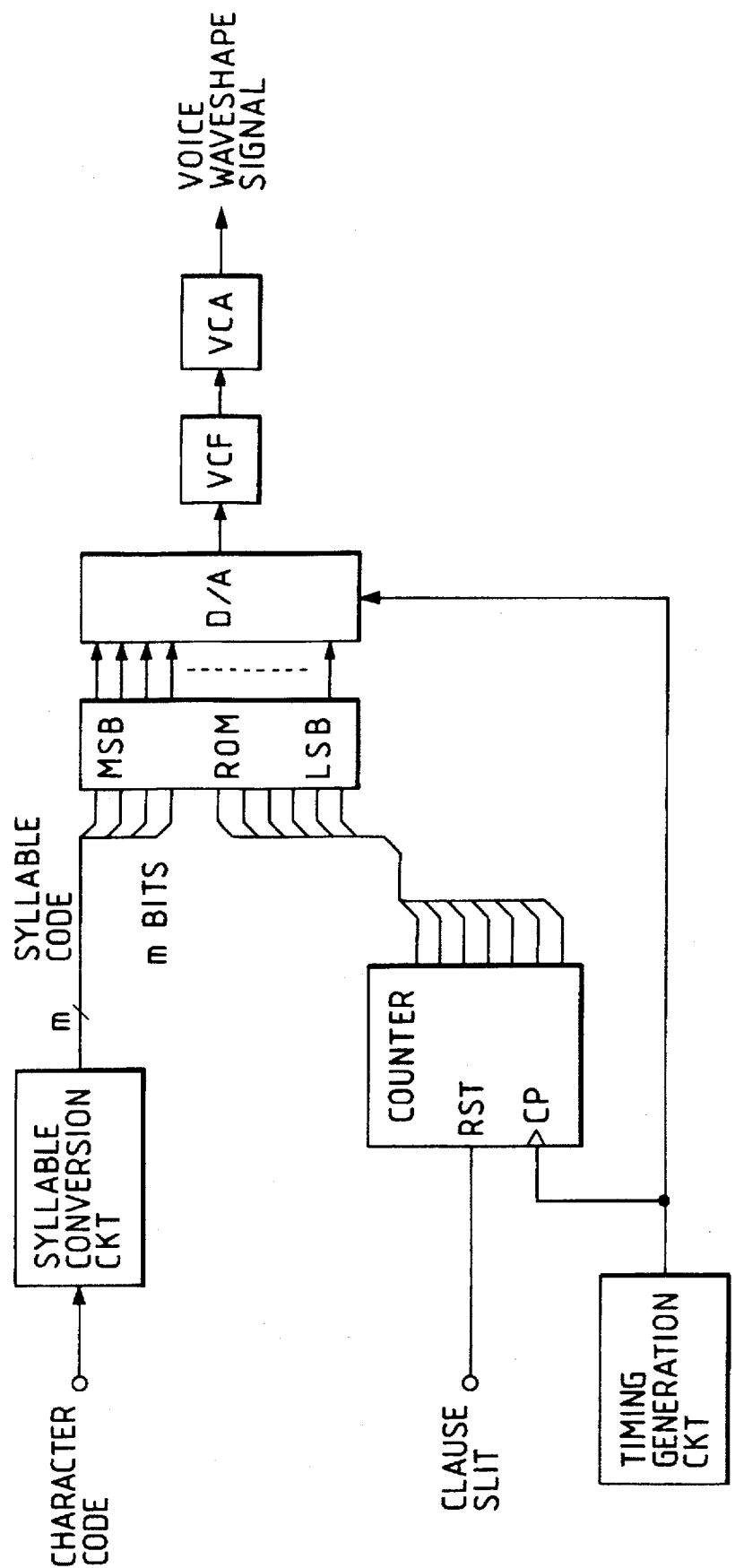
FIG. 25 is a circuit diagram showing an example of a voice synthesis circuit 140.
Figure 26:
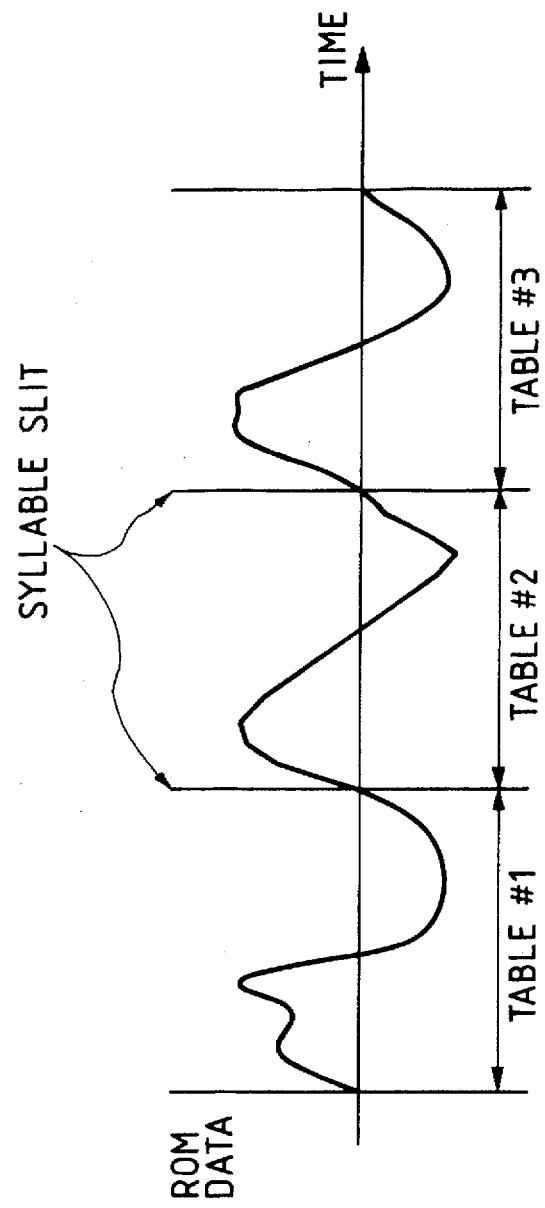
FIG. 26 is a chart showing the relation between a wave table and output voice.

FIG. 25 shows an example of circuit configuration of the voice synthesis circuit 140, and FIG. 26 shows the relationship between a wave table and the output voice. Based on the character code obtained from the character recognition circuit 122, a pronunciation code is obtained from the pronunciation code table of the characters, and said pronunciation code is given to the upper and lower bits of the wave table by counting the signals from the timing generation circuit. The coutner is reset for each syllable, and the data from the wave table are supplied in succession to a D/A converter. Then the data are subjected to wave form shaping by a voltage controlled filter and adjusted to an optimum level by a voltage controlled amplifier, whereby an audible sound is released from the speaker 64.

Figure 12:
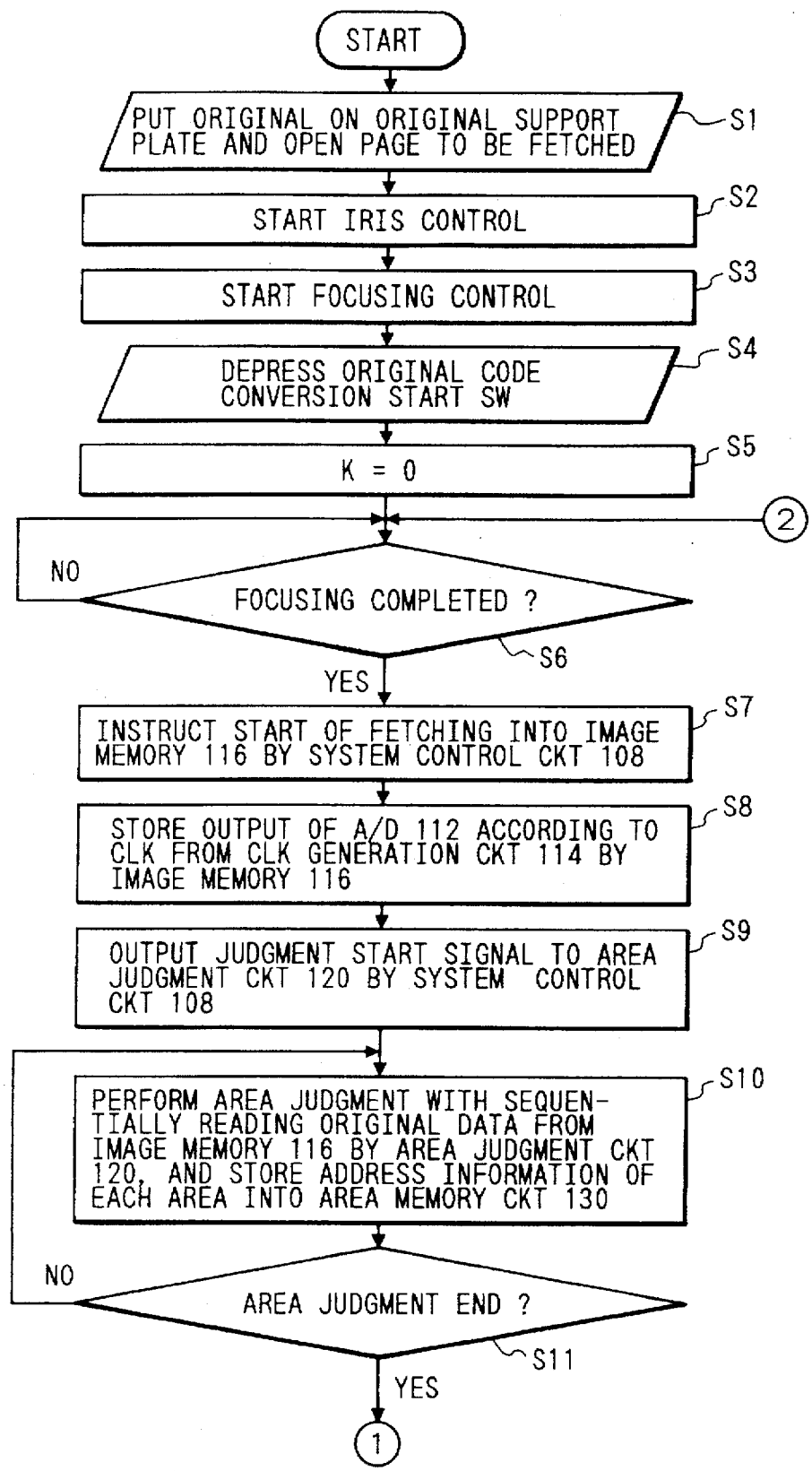
FIGS. 12 to 14 are partial flow charts showing the control sequence of said embodiment.
Figure 13:
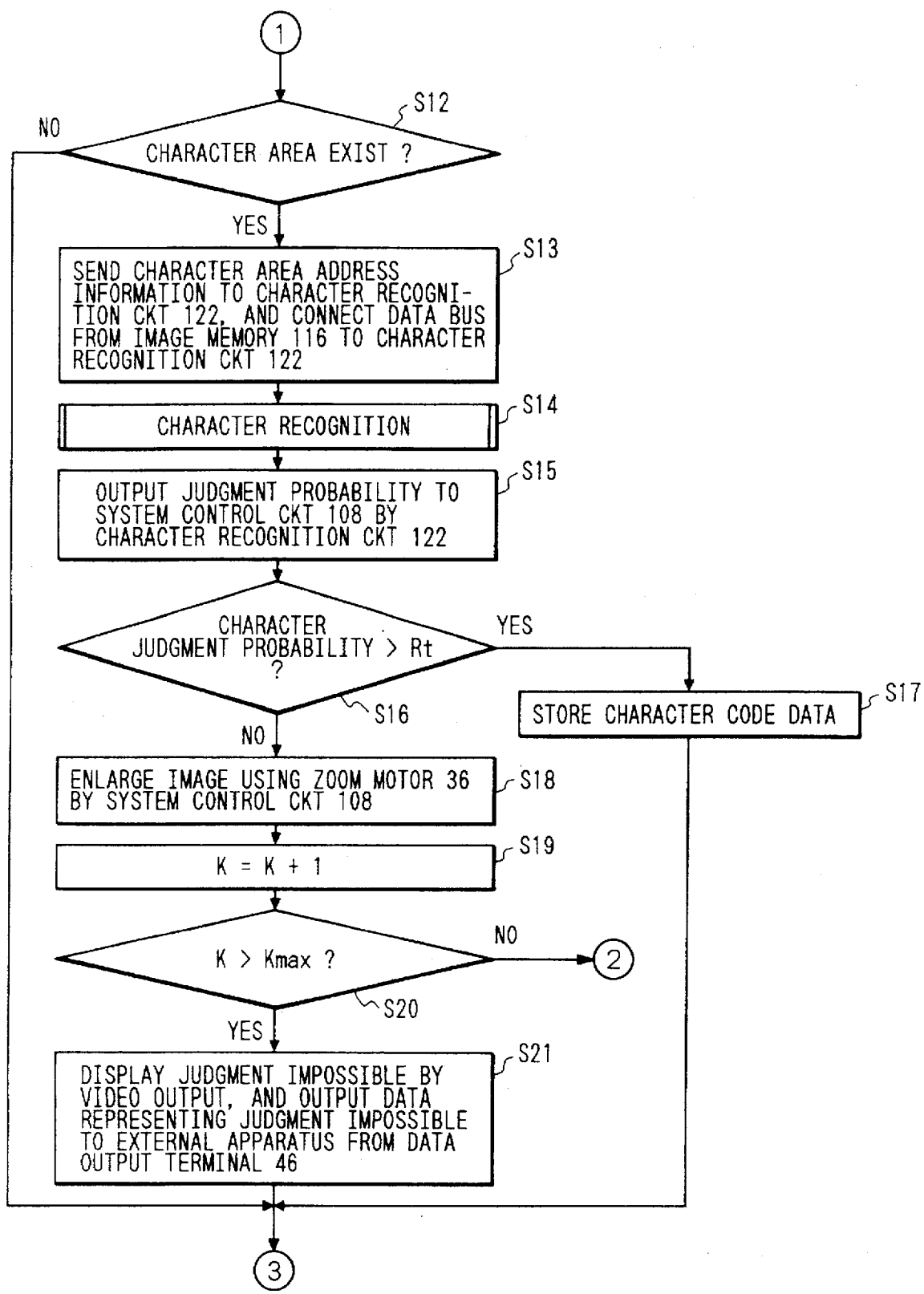
Figure 14:
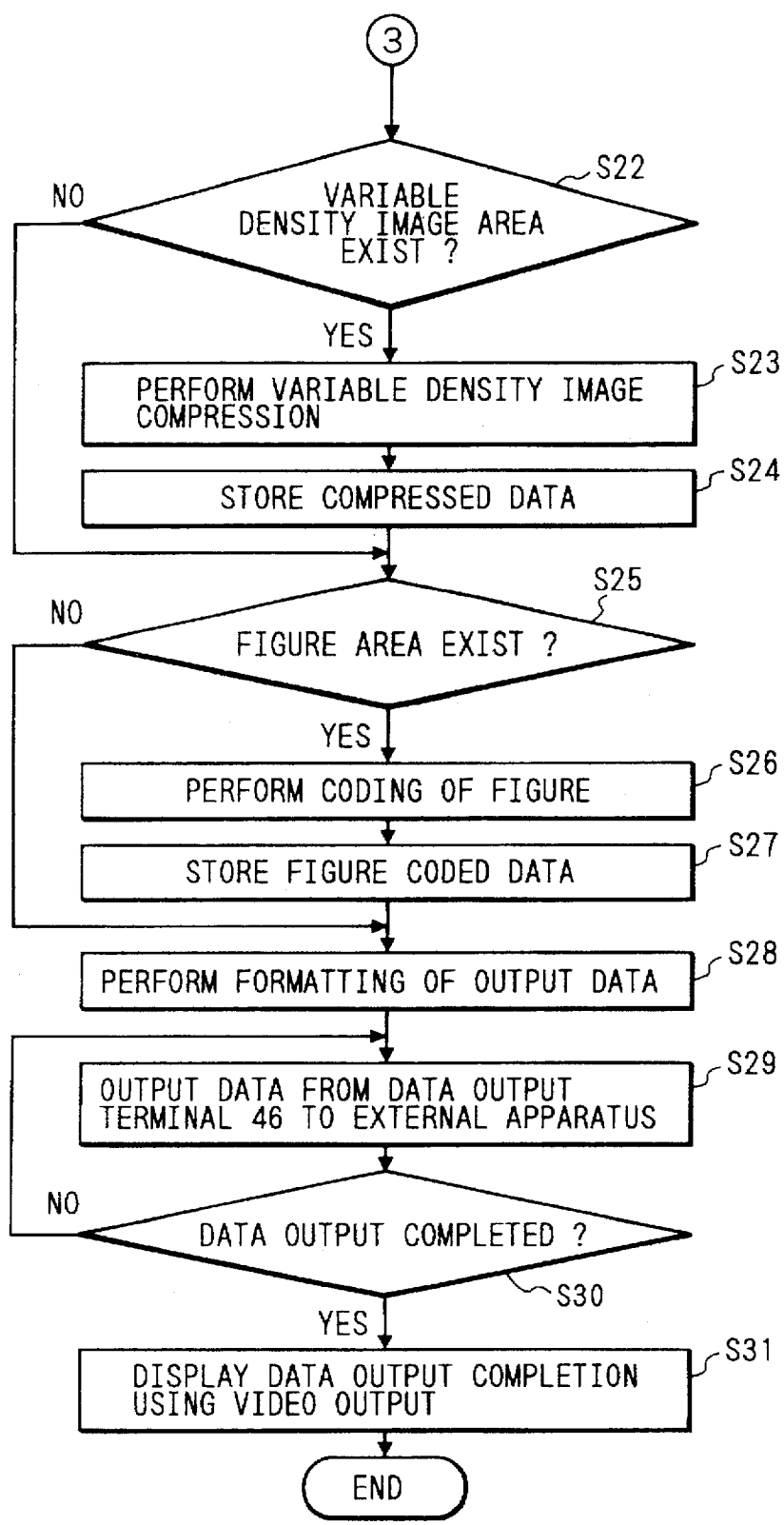
Figure 27:
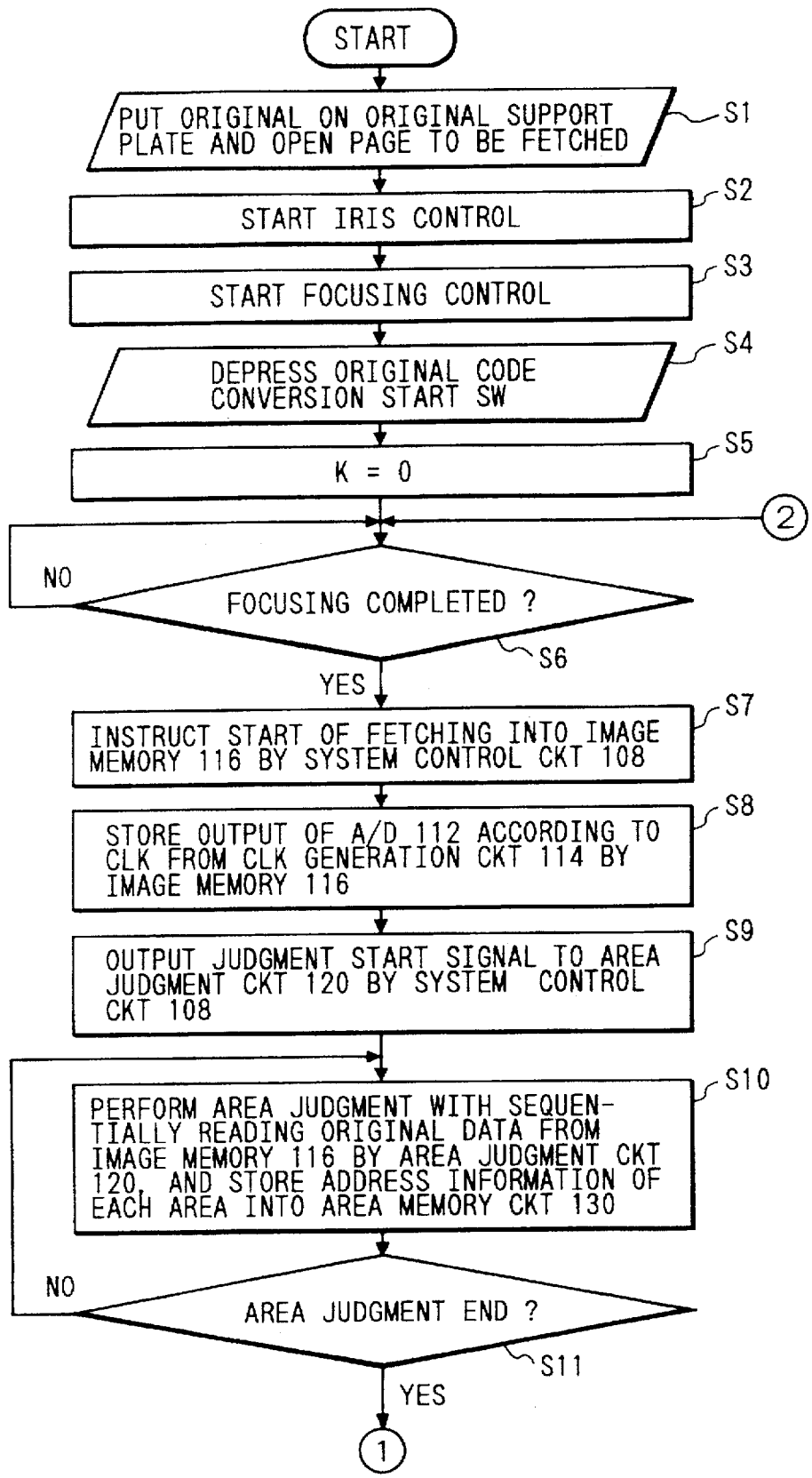
FIGS. 27 to 29 are partial flow charts showing the control sequence of the embodiment shown in FIG. 19.
Figure 28:
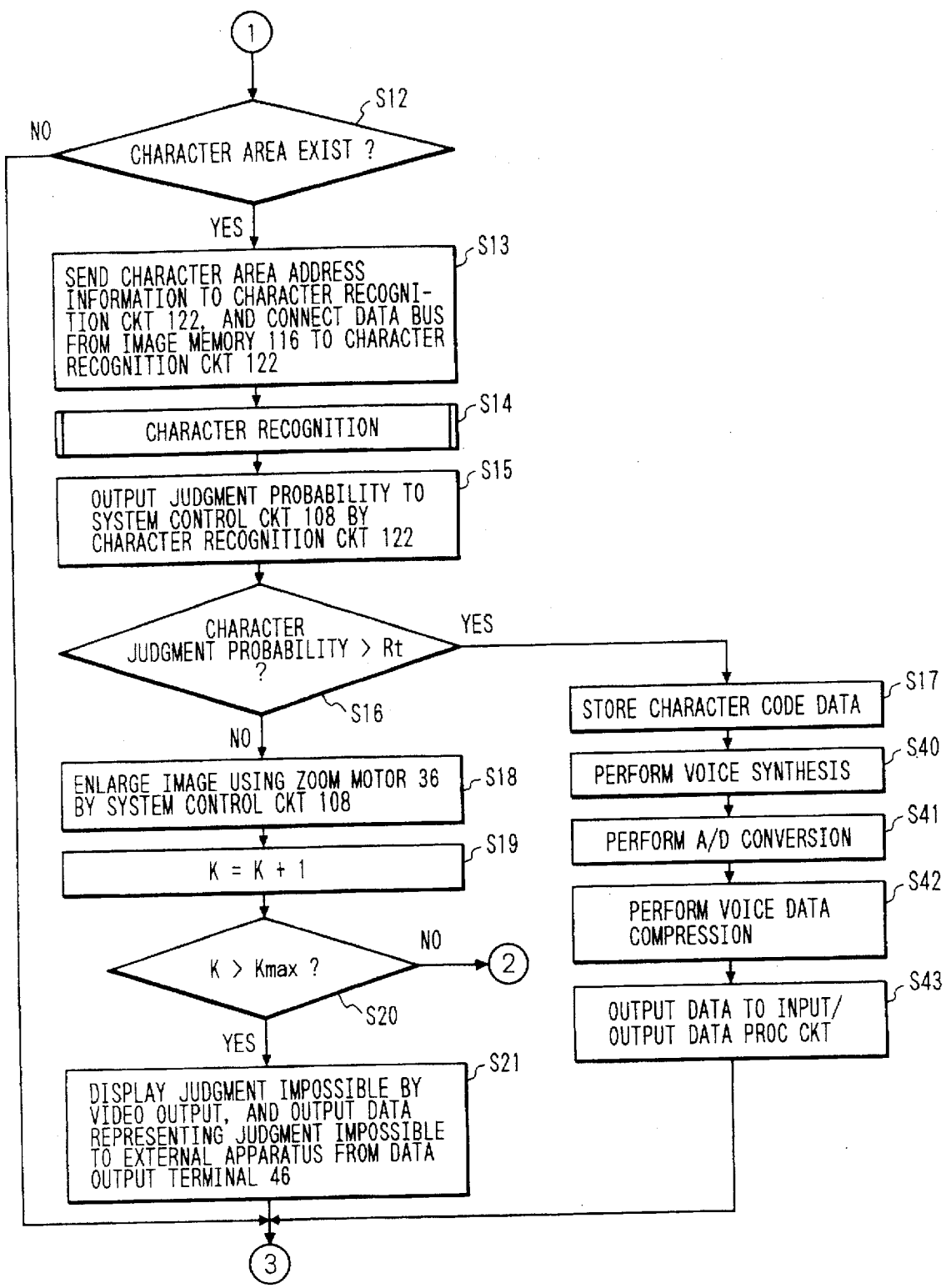
Figure 29:
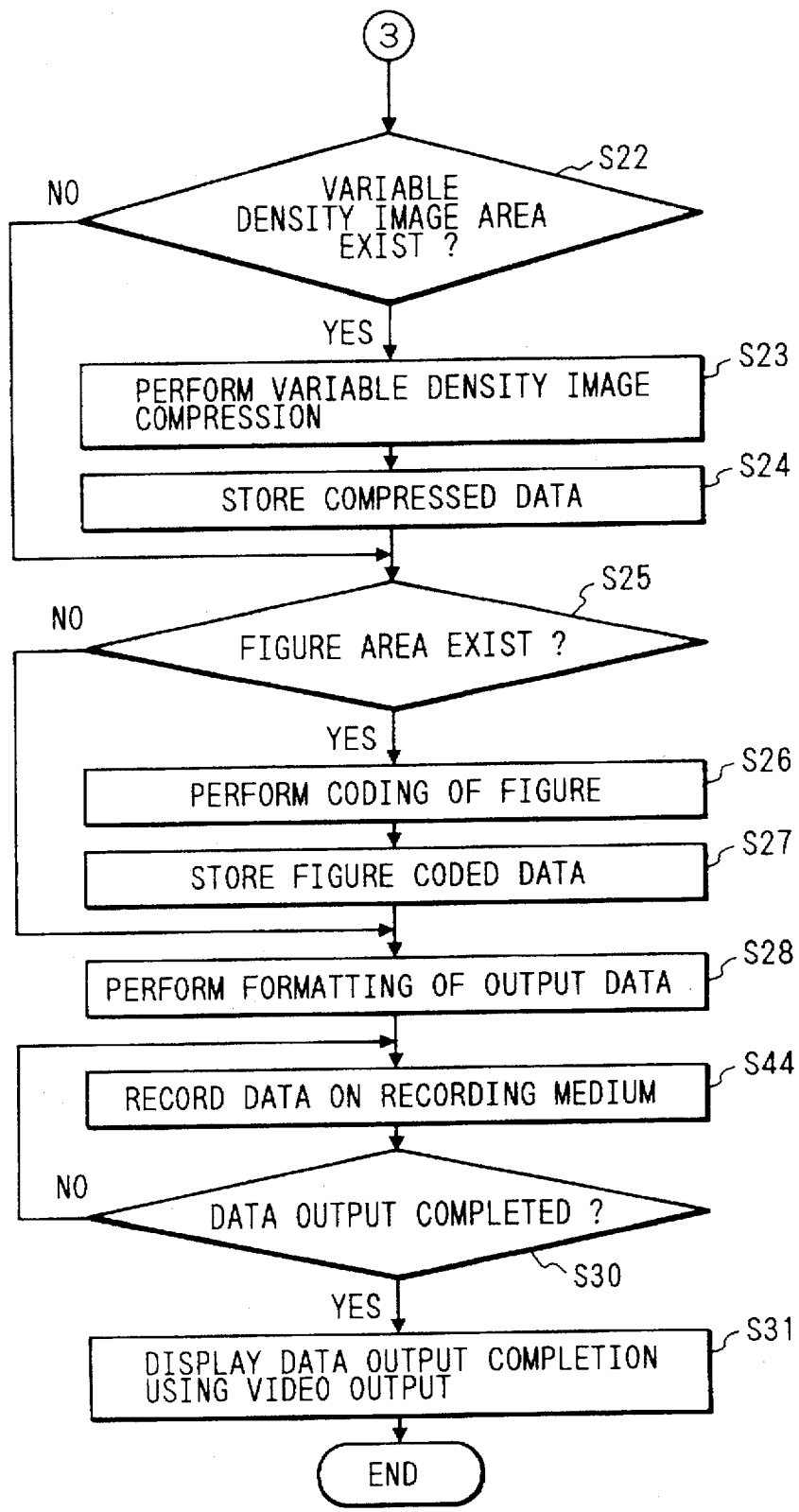

FIGS. 27, 28 and 29 are flow charts of the data input operation of the embodiment shown in FIG. 19, wherein the steps same as those in FIGS. 12, 13 and 14 are represented by same numbers. FIG. 27 is identical with FIG. 12. FIGS. 28 and 29 are different from FIGS. 13 and 14 only in the processing of the recognized character codes and in the recording on the floppy disk. After a character code is obtained for the recognized character (S17), the voice synthesis is conducted (S40), then the synthesized voice signal is digitized (S41), then compressed (S42) and supplied to the output data process circuit 146 (S43). The output data process circuit 146 sends the compressed voice data, encoded graphic pattern data and compressed gradation image data to the driving circuit 62 for recording on the floppy disk 60 (S44).

In the embodiment shown in FIG. 19, the entered information can be displayed and released as voice only at the input, but the image display and the voice output of the information recorded on the floppy disk 60 can also be easily achieved. FIG. 30 is a block diagram of an electrical circuit therefor. The output data process circuit 146 is replaced by an input/output data process circuit 152, and the reproduced data from the driving circuit 62 are supplied to a voice output device 154 for voice output and are also developed by a dot development circuit 156 for graphic pattern and gradation image, then converted by an encoder 158 into a predetermined video format, and supplied to an external monitor through an adder 132 and a video output terminal 44.

As will be easily understood from the foregoing description, the present invention enables a significant reduction in the data amount, as the character portion in the input image is converted into character codes by the character recognition means. The total data amount can be further reduced, since the data amount in other areas is reduced by the data reduction means and the image compression means. Also the probability of character recognition can be improved by zooming operation of the phototaking optical system. Furthermore, the use of image pickup means enables easy and prompt data input.

What is claimed is:

1. A data input apparatus comprising:

optical zooming means for providing an image, said optical zooming means having a focusing lens and a zooming lens;

image pickup means for converting the image into an electrical signal;

area judgment means responsive to the electrical signal for judging at least a character area in the image;

character recognition means for performing a character recognition operation to convert a character image, in the character area judged by said area judgment means, into a character code;

detecting means for detecting failure of the character recognition operation and generating a detection signal; and control means for enlarging the image with said optical zooming means in response to the detection signal and controlling said character recognition means to perform the character recognition operation again.

2. An apparatus according to claim 1, wherein said area judgment means further judges a graphic pattern area in the image.

3. An apparatus according to claim 2, further comprising graphic pattern encoding means for encoding a graphic pattern in the graphic pattern area, judged by said area judgment means, according to a predetermined method.

4. An apparatus according to claim 1, wherein said area judgment means further judges a gradation image area in the image.

5. An apparatus according to claim 4, further comprising image compression means for compressing a gradation image in the gradation image area judged by said area judgment means.

6. A data input apparatus comprising:

optical zooming means for providing an image, said optical zooming means having a focusing lens and a zooming lens;

image pickup means for converting the image into an electrical signal;

character recognition means responsive to the electrical signal for performing a character recognition operation to convert a character image of the image from said optical zooming means into a character code;

detecting means for detecting failure of the character recognition operation and generating a detection signal; and control means for enlarging the image with said optical zooming means in response to the detection signal and controlling said character recognition means to perform the character recognition operation again.

7. An apparatus according to claim 1, further comprising warning means for warning when said character recognition means cannot convert the character image into the character code even if the original image is enlarged by said optical zooming means.

8. An apparatus according to claim 1, further comprising recording means for recording the character code converted by said character recognition means.

9. An apparatus according to claim 1, further comprising voice process means for converting the character code, converted by said character recognition means, into a voice signal.

10. An apparatus according to claim 6, further comprising warning means for warning when said character recognition means cannot convert the character image into the character code even if the original image is enlarged by said optical zooming means.

11. An apparatus according to claim 6, further comprising recording means for recording the character code converted by said character recognition means.

12. An apparatus according to claim 6, further comprising data reduction means for reducing data other than the character code converted by said character recognition means.

13. An apparatus according to claim 6, further comprising voice process means for converting the character code, converted by said character recognition means, into a voice signal.

14. An apparatus according to claim 13, further comprising voice output means for outputting the voice signal converted by said voice process means.

15. A data input apparatus comprising:

optical zooming means for providing an image, said optical zooming means having a focusing lens and a zooming lens;

image pickup means for converting the image into an electrical signal;

area judgment means responsive to the electrical signal for performing an area judgment operation to judge at least a character area from the image;

detecting means for detecting failure of the area judgment operation and generating a detection signal; and control means for enlarging the original image with said optical zooming means in response to the detection signal and controlling said area judgement means to perform the area judgement operation again.

16. An apparatus according to claim 15, wherein said area judgment means further judges a graphic pattern area in the image.

17. An apparatus according to claim 16, further comprising graphic pattern encoding means for encoding a graphic pattern in the graphic pattern area, judged by said area judgment means, according to a predetermined method.

18. An apparatus according to claim 15, wherein said area judgment means further judges a gradation image area in the image.

19. An apparatus according to claim 18, further comprising image compression means for compressing a gradation image in the gradation image area judged by said area judgment means.

20. An apparatus according to claim 15, further comprising warning means for warning when said area judgment means cannot judge at least the character area even if the image is enlarged by said optical zooming means.

21. An apparatus according to claim 1, wherein said detecting means detects generation of a predetermined amount of error.

22. An apparatus according to claim 6, wherein said detecting means detects generation of a predetermined amount of error.

23. An apparatus according to claim 15, wherein said detecting means generation of a predetermined amount of error.

24. An apparatus according to claim 1, further comprising image encoding means for encoding a graphic pattern image in said binary level image area judged by said area judgment means.

25. An apparatus according to claim 9, further comprising voice output means for outputting the voice signal converted by said voice process means.

26. An apparatus according to claim 1, further comprising magnification detection means for detecting a magnification of said optical zooming means, wherein said control means controls said character recognition means to perform the character recognition operation again if it is detected by said magnification detection means that the magnification of said optical zooming means is not a maximum magnification.

27. An apparatus according to claim 6, further comprising magnification detection means for detecting a magnification of said optical zooming means, wherein said control means controls said character recognition means to perform the character recognition operation again if it is detected by said magnification detection means that the magnification of said optical zooming means is not a maximum magnification.

28. An apparatus according to claim 15, further comprising magnification detection means for detecting a magnification of said optical zooming means, wherein said control means controls said area judgement means to perform the area judgement operation again if it is detected by said magnification detection means that the magnification of said optical zooming means is not a maximum magnification.

* * * * *

UNITED STATES PATENT AND TRADEMARK OFFICE
CERTIFICATE OF CORRECTION

PATENT NO. : 5,719,969
DATED : February 17, 1998
INVENTOR(S) : TOMISHIGE TAGUCHI It is certified that error appears in the above-identified patent and that said Letters Patent is hereby corrected as shown below:

COLUMN 1
    Line 39, "example" should read --example,--.

COLUMN 4
    Line 29, "motor.30" should read --motor 30--;
    Line 61, "following" should read --following,--.

COLUMN 7
    Line 61, "following" should read --following,--.

COLUMN 8
    Line 55, "compressed" should read --compresses--.

COLUMN 9
    Line 17, "following" should read --following,--.

UNITED STATES PATENT AND TRADEMARK OFFICE
CERTIFICATE OF CORRECTION

PATENT NO. : 5,719,969
DATED : February 17, 1998
INVENTOR(S) : TOMISHIGE TAGUCHI It is certified that error appears in the above-identified patent and that said Letters Patent is hereby corrected as shown below:

COLUMN 10
  Line 21, "Also" should read --Also,--;
  Line 25, "Consequently" should read --Consequently,--;
  Line 41, "following" should read --following,--;
  Line 62, "following" should read --following,--.

COLUMN 14
  Line 25, "means" should read --means detects--.

Signed and Sealed this

Eighth Day of September, 1998

Attest:

BRUCE LEHMAN

*Attesting Officer*        *Commissioner of Patents and Trademarks*